(12) United States Patent
Kimia

(10) Patent No.: US 11,112,261 B2
(45) Date of Patent: Sep. 7, 2021

(54) NAVIGATION METHODS AND APPARATUS FOR THE VISUALLY IMPAIRED

(71) Applicant: Brown University, Providence, RI (US)

(72) Inventor: Benjamin Kimia, Providence, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 15/697,966

(22) Filed: Sep. 7, 2017

(65) Prior Publication Data

US 2018/0066953 A1  Mar. 8, 2018

Related U.S. Application Data

(63) Continuation of application No. 14/707,163, filed on May 8, 2015, now abandoned.

(Continued)

(51) Int. Cl.
 *G01C 21/36* (2006.01)
 *G06K 9/00* (2006.01)
 (Continued)

(52) U.S. Cl.
 CPC ....... *G01C 21/3652* (2013.01); *G01C 21/206* (2013.01); *G01C 21/3602* (2013.01); *G01C 21/3629* (2013.01); *G06F 3/005* (2013.01); *G06F 3/016* (2013.01); *G06K 9/00671* (2013.01); *G06T 7/80* (2017.01);
 (Continued)

(58) Field of Classification Search
 CPC ... H04N 13/0239; G06T 7/246; G06T 7/0085; G06T 7/0065; G06T 7/80; G06T 2207/30244; G06T 2207/10028; G06T 2207/10024; G06T 2207/10021; G06T 2207/10016; G06K 9/00671;
 (Continued)

(56) References Cited

U.S. PATENT DOCUMENTS

| 6,198,395 B1 * | 3/2001 | Sussman | A61F 9/08 340/407.1 |
| 7,598,976 B2 * | 10/2009 | Sofer | A61H 3/061 348/62 |

(Continued)

OTHER PUBLICATIONS

Fabbri, "Multiview Differential Geometry in Application to Computer Vision," Providence, Rhode Island, May 2011. 232 pages.
U.S. Appl. No. 14/707,163, filed May 8, 2015, Kimia.

*Primary Examiner* — Tung T Vo
(74) *Attorney, Agent, or Firm* — Adler Pollock & Sheehan P.C.

(57) ABSTRACT

According to some aspects, a wearable device for estimating a location of the device within a space is provided, the device comprising a plurality of cameras mounted to a structure, at least a portion of the structure being adapted to facilitate a user wearing the device, the plurality of cameras having substantially fixed positions and orientations on the structure relative to each other, and at least one processor configured to receive image data from the plurality of cameras, perform feature detection on the image data to obtain a first plurality of features from the image data, and determine an estimate of the location of the device in the space based, at least in part, on a location associated with a second plurality of features obtained from image data previously captured of the space that matches the first plurality of features.

15 Claims, 14 Drawing Sheets

Related U.S. Application Data

(60) Provisional application No. 61/990,638, filed on May 8, 2014.

(51) Int. Cl.
  *G06F 3/01* (2006.01)
  *G01C 21/20* (2006.01)
  *G06F 3/00* (2006.01)
  *G06T 7/80* (2017.01)

(52) U.S. Cl.
  CPC .............. *G06T 2207/10016* (2013.01); *G06T 2207/10021* (2013.01); *G06T 2207/10024* (2013.01); *G06T 2207/10028* (2013.01); *G06T 2207/30244* (2013.01)

(58) Field of Classification Search
  CPC ........... G01C 21/3652; G01C 21/3629; G01C 21/3602; G01C 21/206; G06F 3/005; G06F 3/016
  USPC .......................................................... 348/62
  See application file for complete search history.

(56) References Cited

U.S. PATENT DOCUMENTS

| | | | |
|---|---|---|---|
| 9,202,353 B1* | 12/2015 | Sisbot | G06K 9/00335 |
| 9,488,833 B2* | 11/2016 | Cervantes | H04N 13/0239 |
| 9,805,619 B2* | 10/2017 | Cervantes | G02B 27/0172 |
| 2007/0182739 A1* | 8/2007 | Platonov | G06T 15/20 345/427 |
| 2008/0058894 A1* | 3/2008 | Dewhurst | G09B 21/007 607/54 |
| 2010/0253525 A1* | 10/2010 | Engel | G08B 6/00 340/573.1 |
| 2012/0143495 A1* | 6/2012 | Dantu | G01C 21/206 701/428 |
| 2012/0268563 A1* | 10/2012 | Chou | H04N 13/271 348/46 |
| 2013/0093852 A1* | 4/2013 | Ye | A61H 3/061 348/46 |
| 2013/0218456 A1* | 8/2013 | Zelek | G01C 21/3652 701/412 |
| 2014/0147032 A1* | 5/2014 | Yous | G06T 7/246 382/154 |
| 2014/0375782 A1* | 12/2014 | Chichilnisky | G06K 9/00671 348/62 |
| 2015/0168727 A1* | 6/2015 | Qaddoura | G02B 27/0172 345/156 |
| 2015/0201181 A1* | 7/2015 | Moore | H04N 13/0239 348/47 |
| 2015/0310667 A1* | 10/2015 | Young | G06K 9/46 345/633 |
| 2015/0324646 A1 | 11/2015 | Kimia | |

\* cited by examiner

NAVIGATION METHODS AND APPARATUS FOR THE VISUALLY IMPAIRED

CROSS REFERENCES TO RELATED APPLICATIONS

This application claims benefit under 35 U.S.C. § 120 and is a continuation of U.S. patent application Ser. No. 14/707,163, filed May 8, 2015, entitled "Navigation Methods and Apparatus for the Visually Impaired," which claims the benefit under 35 U.S.C. § 119(e) of U.S. Provisional Patent Application No. 61/990,638, filed May 8, 2014, titled "Navigation Methods and Apparatus for the Visually Impaired," each application of which is herein incorporated by reference in its entirety.

BACKGROUND

It is estimated that there are around 285 million visually impaired people worldwide. 39 million of these people are blind and 246 million have low vision, and there are about 10 million visually impaired people in the U.S. alone. Visual impairment not only affects the visually impaired person, but impacts family and friends who may be responsible for assisting the visually impaired with routine tasks, including those involving mobility. To facilitate a minimal level of independent mobility, the visually impaired often make use of a cane instrument to avoid obstructions or to identify known structures such as walls, doorways, etc. to facilitate navigating familiar surroundings. However, the visually impaired are often dependent on family and friends to shop, navigate outdoors and indoors, and otherwise function in generally unfamiliar or complex environments where a visually impaired individual may not have an understanding of the layout of the space and/or where places/things are located. Limitations resulting from visual impairment can restrict employment options or render them infeasible.

Traditional approaches to giving the visually impaired increased mobility and independence include altering the environment or surroundings to provide needed navigation cues to the visually impaired (e.g., by installing active and passive devices in intersections, doorways, elevators, shopping aisles, etc.). However, such solutions require specialized installation and, while capable of alerting the visually impaired that they are proximate some fixed location, are very limited from the navigational perspective.

Existing navigation systems designed for the sighted rely on Global Positioning Satellite (GPS) technology or the like. However, GPS technology does not work well in indoor environments, generally does not provide the level of precision needed to guide users as they walk, particularly visually impaired users. Additionally, GPS technology has not been developed in conjunction with or integrated with technology that would allow GPS information to be conveyed to the visually impaired in a meaningful way to allow for satisfactory navigation.

SUMMARY

The inventors have developed a navigation system adapted to facilitate navigation for the visually impaired using techniques for identifying a current location of a user of the navigation system, receiving an indication of a desired destination and providing navigation instructions to the user to assist in guiding the user to the desired destination. According to some embodiments, one or any combination of image processing, haptic feedback and/or odometry is utilized to facilitate navigation to desired locations, some exemplary techniques of which are discussed in further detail below. According to some embodiments, techniques described herein may provide information to a user of the navigation system regarding their surrounding environment in addition, or alternatively, to directions to a navigation destination.

Some embodiments include a wearable device for estimating a location of the device within a space, the device comprising a plurality of cameras mounted to a structure, at least a portion of the structure being adapted to facilitate a user wearing the device, the plurality of cameras having substantially fixed positions and orientations on the structure relative to each other, and at least one processor configured to receive image data from the plurality of cameras, perform feature detection on the image data to obtain a first plurality of features from the image data, and determine an estimate of the location of the device in the space based, at least in part, on a location associated with a second plurality of features obtained from image data previously captured of the space that matches the first plurality of features.

Some embodiments include a method of estimating a location of a device within a space, the device comprising a plurality of cameras, the method comprising receiving image data from the plurality of cameras, the plurality of cameras mounted to a structure of the device, at least a portion of the structure being adapted to facilitate a user wearing the device, the plurality of cameras having substantially fixed positions and orientations on the structure relative to each other, performing feature detection on the image data to obtain a first plurality of features from the image data, and determining an estimate of the location of the device in the space based, at least in part, on a location associated with a second plurality of features obtained from image data previously captured of the space that matches the first plurality of features.

Some embodiments include a wearable device for directing a wearer to a target location within a space using haptic feedback, the device comprising a wearable haptic feedback unit configured to provide to a wearer a plurality of haptic gestures indicating a direction in which the wearer should move, and at least one processor coupled to the haptic feedback unit and configured to determine the direction in which the wearer should move based, at least in part, on an estimate of a current location of the wearable device within the space and the target location, and cause the haptic feedback unit to render at least one of the plurality of haptic gestures corresponding to the determined direction.

Some embodiments include a method for directing a user to a target location within a space, the method comprising determining a direction in which the user should move based, at least in part, on an estimate of a current location of the user within the space and the target location, identifying at least one haptic gesture of a plurality of haptic gestures as corresponding to the identified direction, and causing a haptic feedback unit to render the at least one haptic gesture to the user.

Some embodiments include a wearable device that determines a spatial location of the device based on odometry data and a previously determined spatial location of the device, comprising a plurality of cameras, a visual odometer configured to receive image data from the plurality of cameras and to generate first motion data based at least in part on the received image data, an inertial odometer configured to determine inertial data corresponding to motion of the wearable device and to generate second motion data based at least in part on the inertial data, and at least one processor configured to determine the spatial location of the device based at least in part on the previously determined spatial location, the first motion data, and the second motion data.

Some embodiments include a method of determining a spatial location of a wearable device based on odometry data and a previously determined spatial location of the device, comprising receiving image data from a plurality of cameras of the wearable device, generating first motion data based at least in part on the received image data, determining inertial data corresponding to motion of the wearable device, generating second motion data based at least in part on the inertial data, and determining the spatial location of the device based at least in part on the previously determined spatial location of the device, the first motion data, and the second motion data.

Some embodiments include a method of updating map data, comprising obtaining map data comprising a first track having a first plurality of nodes each having an associated spatial location, at least a first node of the first plurality of nodes associated with first image data for a spatial location associated with the first node, receiving track data associated with a second track comprising a second plurality of nodes each having an associated spatial location, at least a second node of the second plurality of nodes associated with second image data for a spatial location associated with the second node, matching at least one feature of the first image data with at least one feature of the second image data, and updating the map data using at least the second node of the track data associated with the second track.

Some embodiments include at least one computer readable medium comprising instructions that, when executed, perform a method of updating map data, the method comprising obtaining map data comprising a first track having a first plurality of nodes each having an associated spatial location, at least a first node of the first plurality of nodes associated with first image data for a spatial location associated with the first node, receiving track data associated with a second track comprising a second plurality of nodes each having an associated spatial location, at least a second node of the second plurality of nodes associated with second image data for a spatial location associated with the second node, matching at least one feature of the first image data with at least one feature of the second image data, and updating the map data using at least the second node of the track data associated with the second track.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
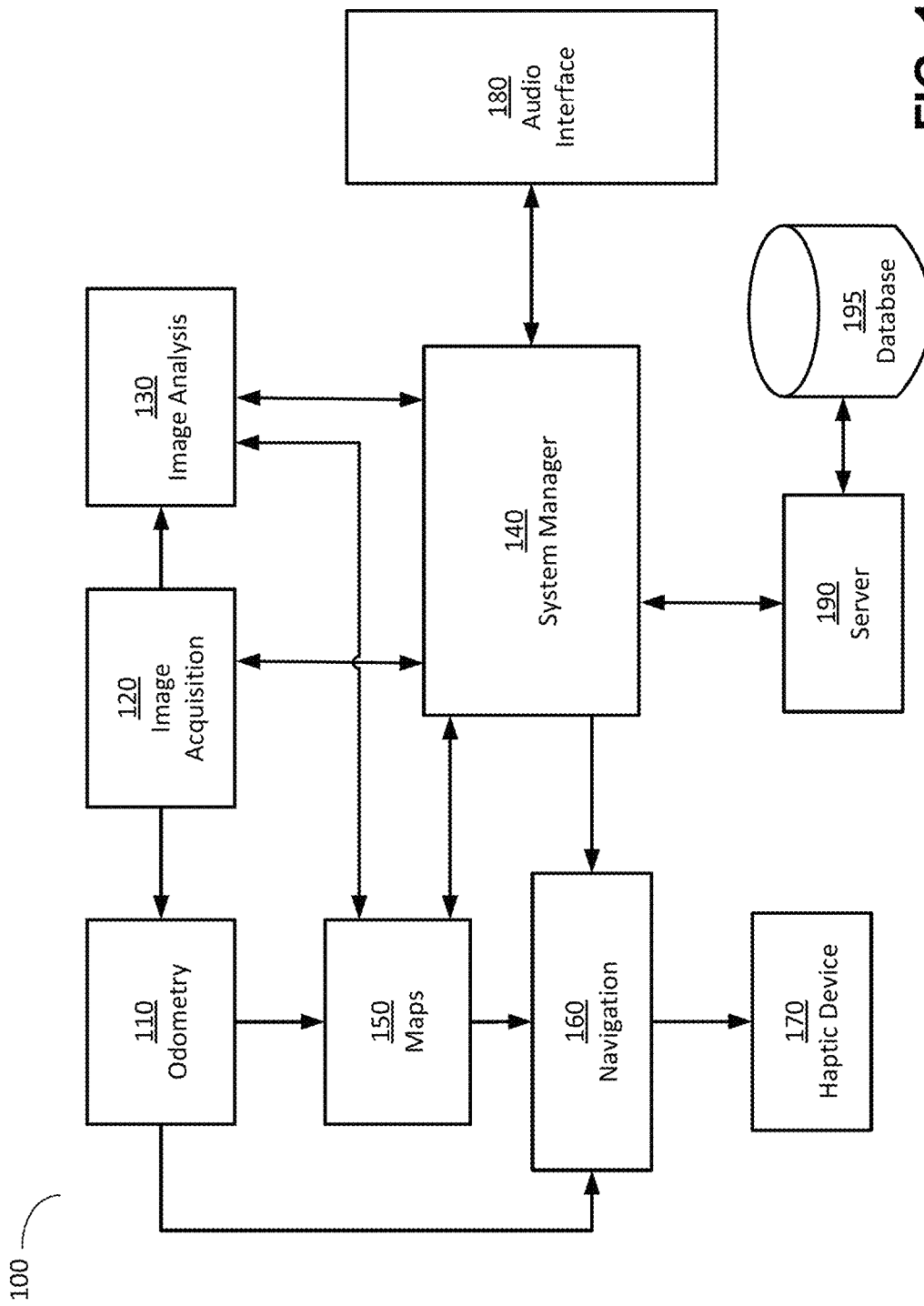
FIG. 1 depicts a schematic view of a system suitable for practicing aspects of the invention, according to some embodiments.

Presently, there is no generally suitable technology for assisting the visually impaired in navigating through unfamiliar environments, guiding the visually impaired to a desired destination, and/or conveying to the visually impaired location and/or direction information with respect to a given space or locale. To the extent that navigation systems are available at all, they are typically GPS-based solutions designed for the sighted. As a result, such technologies are generally limited to outdoor locations and alone may not have sufficient resolution for use as a navigation aid to the visually impaired (e.g., a GPS system may be capable of resolving location to within a few meters, which may be insufficient to assist the visually impaired in navigating through the types of environments that the visually impaired need to navigate to reach a desired destination). In addition, the visually impaired may need assistance with navigating to specific destinations about which GPS systems typically do not have information, such as interior rooms or spaces (e.g., stores in a mall or departments in a hospital), bathrooms, exits, elevators, stairways, locations where GPS signals are compromised, etc. As such, while the sighted may take navigation to such destinations for granted, for a visually impaired person, finding a specific destination (e.g., a bathroom) in an unfamiliar and/or relatively large or complex space (e.g., such as a shopping mall), is generally not feasible without human assistance.

To address one or more issues related to generally independent navigation by the visually impaired, the inventors have developed computer vision techniques (e.g., image analysis, feature detection, pattern recognition, etc.) adapted to determine a user's location and/or to facilitate navigating a user to a desired destination. A navigation system employing computer vision techniques to determine location and/or to provide navigation instruction may allow for its use in both indoor and outdoor environments. It should be understood that any environment for which image data has been acquired may be suitable in this respect, while other technologies (including GPS) may be utilized in environments for which appropriate image data has not been captured or is otherwise not available, as discussed in further detail below.

The inventors have further recognized that conveying navigation instructions to the visually impaired may be facilitated via haptic feedback and have developed intuitive haptic gestures to assist in directing the movement of the visually impaired to guide the user to a desired destination.

Haptic gestures may be rendered to a visually impaired user based at least in part on the user's location and a destination to which the user is being guided. In this respect, the inventors have developed an odometry system adapted to keep track of the user's location and/or trajectory so that appropriate haptic gestures can be rendered to the user to direct the user in the appropriate direction. According to some embodiments, an inertial odometry system and/or a visual odometry system is provided to assist in tracking the location and/or trajectory of the user, and one or more haptic gestures are provided to the user (e.g., wearer of a navigation device) based on the user's current location relative to a desired destination and/or based on a deviation from a desired route, as discussed in further detail below.

The inventors have recognized that a navigation system incorporating one or more of the above described techniques may be advantageously implemented as one or more wearable devices adapted to determine a wearer's location and provide directions to a target location. According to some embodiments, a navigation system includes one or more cameras disposed on a wearable device such as eye wear (e.g., eye glasses) or a headset, visor, etc. Information may be combined from multiple cameras to provide information on the environment of the navigation system. For example, cameras on the front and sides of a wearable device may allow features present in images captured by multiple cameras to be correlated, which may thereby provide a more accurate and/or detailed assessment of the environment than would be possible using a single camera.

In some embodiments, image data captured by one or more cameras of a navigation system may be compared with stored image data to locate a user within a space. The term "image data" refers herein to any information representative of or derived from one or more images including, but not limited to, raw pixel data (e.g., one or more images or portions thereof), features extracted from pixel data, or any other information derived therefrom (e.g., so-called "metadata" describing camera parameters such as resolution, zoom, focus, GPS location, time, day, etc., and/or information derived from processing or otherwise analyzing pixel data). Comparison of image data may include, for example, feature detection and correlation. The stored image data may include image data obtained during prior visits to the location within the space and may have been acquired by other users that previously navigated the space and/or by initial pilot mappings of the space. To facilitate guiding the visually impaired, a user navigating a space may capture images (e.g., via video capture by one or more image acquisition devices) at the user's location. The captured imagery may be analyzed to identify certain features of interest, which may be compared to a data store of previously obtained image data for which the location from which the image data was obtained is known. The image data that provides a best match for the image data acquired at the user's current location may be used to determine the user's location.

In some cases, image data may be captured at a slightly different location and/or orientation than previously captured image data. However, by using appropriate computer vision techniques described herein, corresponding features in the presently acquired and previously captured image data may nonetheless be identified to determine a location of the user.

In some embodiments, a navigation system may include an inertial and/or visual odometry component configured to keep track of the location of a user of the navigation system. Inertial odometry may include any one or combination of components that determine motion based on inertial measurements (e.g., accelerometers, magnetometers, gyroscopes, etc.) so the location and/or trajectory of the user can be tracked and updated. Visual odometry may be performed by identifying one or more features in image data captured using one or more cameras of a wearable component of the navigation system and estimating movement of the navigation system based on the one or more features (e.g., by using feature matching techniques as described above). According to some embodiments, inertial odometry data may be combined with visual odometry data for a navigation system to facilitate accurate determination of the location and/or trajectory of the user of the navigation system. An odometry component of the navigation system, independent of the techniques utilized, may therefore be adapted to track the location of the user (e.g., wearer) of the navigation system.

In some embodiments, a navigation system includes one or more wearable devices configured to receive input from a user, for example, to receive a request for navigation instructions to a desired destination. For example, a wearable microphone may receive a spoken utterance requesting directions from a user and the navigation system may perform speech recognition on the utterance to determine the content of the request (e.g., where the user would like to be directed). Based on the recognized input from the user, the navigation system may determine a route by which the user may be guided to reach the requested destination. However, a user may provide input to a navigation system using other techniques, either in addition or alternative to speech input, as aspects of a navigation system are not limited for use with any particular technique or combination of input modalities.

According to some embodiments, directions to a destination may be determined based on the current location of the user of the navigation system. The user's current location may be determined using computer vision techniques, or any suitable technique for a given environment (e.g., certain environments may not have sufficient image data archived to determine a user's location, but GPS information, radio frequency identification (RFID) information and/or other information may be available to facilitate determining the current location of the user). Directions provided to the user may comprise a heading directly from the current location to the destination in relatively simple cases or may include more complex directions that take into account turns and/or obstacles between the current location and destination. For example, the directions may be based upon a path determined to route the user from their location to a destination where there may be no feasible or safe direct or straight-line path from origin to destination (e.g., a path from origin to destination may need to accommodate building structures, corners, doorways, staircases, obstacles, etc.).

Odometry or other techniques may be performed during navigation to monitor the user's progress so that proper directions may be provided to the user during navigation (which may include dynamic creation or adjustment of directions based on the user's progress). In some embodiments, a known navigational path to a destination is used to route a user along the path by providing suitable navigational instructions to the user along the route. The directions from origin to destination may be conveyed to the user via haptic feedback (e.g., by providing haptic gestures to the user to indicate the direction the user should walk) to provide intuitive navigation instructions to the user. Navigation instructions may be conveyed to the user in other ways, such as audible directions via speech synthesis. However, the inventors have appreciated that conveying navigation instructions via haptic feedback may be preferable as the visually impaired typically rely heavily on their sense of hearing to orient themselves and also to avoid imminent obstacles and audible navigation instructions may negatively impact their ability to do so.

According to some embodiments, a repository storing one or more maps may be accessed by a navigation system, either locally (e.g., by accessing a repository local to the components a user is wearing) or remotely (e.g., via wireless access to a network or the cloud). A map may be associated with a particular space (e.g., a hospital, a government building, a shopping mall, an outdoor space such as a park, etc.) and may include information that facilitates generating directions to navigate the user between any number of locations that have previously been identified in the space. A map may be updated based on data obtained by a navigation system while the user of the navigation system navigates a space associated with the map. For example, one or more users of a navigation system may create a map for a space by navigating through the space and providing data on their movements that can be utilized in generating the map.

According to some embodiments, a navigation system may access a map to obtain instructions to direct a user of the navigation system along a path to a particular destination. For example, when a user requests directions to a location in a space for which a map has been created, the map may be accessed by the navigation system and navigation instructions that convey to the user how to navigate to the requested location may be determined based on the map and the user's current location. In addition, the map may be updated by the navigation system to, for example, improve the accuracy of subsequent directions generated based on the map. Thus, maps may be created, updated and/or shared by a community of users, thereby providing a means for navigation data to be "crowdsourced" through the sharing and communal updating of maps.

Techniques described herein may be utilized to produce a navigation system that facilitates independent navigation by the visually impaired in familiar and/or unfamiliar environments, either indoors, outdoors or both. Some aspects allow data acquired by such navigation systems to be collected, organized and shared so that a library of navigation information may be generated, thus allowing the number and variety of spaces that can be navigated using techniques described herein to expand and/or permitting the quality of navigation information corresponding to particular spaces to be improved.

According to some embodiments, techniques described herein may provide information to a user of the navigation system regarding their surrounding environment in addition, or alternatively, to directions to a navigation destination. In some circumstances, the navigation system may provide information on one or more objects in the vicinity of the user even though none of those objects are identified as a navigation destination or a navigation waypoint. For example, the navigation system may convey information to the user (e.g., via haptic feedback, audio feedback, etc.) that a hazardous object, such as an open manhole cover or a fence, is located in the vicinity of the user (which may include such an object being directly in the path of the user). In some cases, the navigation system may convey information to the user that an object that may be of help and/or interest to the user is located in the vicinity of the user. For example, the navigation system may indicate via suitable mechanism(s) that the user is near an Automated Teller Machine (ATM), a sign, a painting or a fire extinguisher.

Following below are more detailed descriptions of various concepts related to, and embodiments of, a navigation system including wearable devices that determine a location of a user and that provide a location and/or directions to the user. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a navigation system suitable for providing navigation instructions to a visually impaired user, according to some embodiments. System 100 includes odometry module 110, image acquisition module 120, image analysis module 130, system manager 140, maps module 150, navigation module 160, haptic device 170, audio interface module 180, server 190, database 195, and system manager 140 to control the modules of navigation system 100 (e.g., elements 110-130 and 160-180) and to communicate with server 190 and database 195 to obtain data that may be used by the modules of system 100. It should be appreciated that the modules illustrated in FIG. 1 are merely exemplary and a navigation system can be implemented in any number of ways, including additional, fewer or different modules than those that comprise navigation system 100.

Any one or combination of the exemplary components of system 100 may be adapted to be worn and/or carried by a user. For example, image acquisition module 120 may include one or more cameras mounted on a wearable head unit; haptic device 170 may include one or more haptic feedback components provided on a belt or vest; elements 110, 130, 140, 150, 160 and 180 may be carried and/or worn by a user, such as in a backpack and/or clipped to a belt; whereas server 190 and database 195 may be remote devices that are not carried, held or worn by the user but that are accessible via one or more networks using any suitable wireless communication technique (e.g., system manager 140 may be configured with one or more network interfaces configured to communicate with available network(s) using any desired protocol.)

As discussed above, determining the location of a user within a particular space may be achieved using image analysis techniques configured to match image data acquired at a user's current location with image data previously obtained of the space. Image data of a user's current location may be obtained using image acquisition module 120 (either to provide navigation instructions or to acquire image data for a repository or library of image data for a particular space). Image acquisition module 120 may capture images from any number of image acquisition devices that may be mounted to an apparatus that can be worn by a user of system 100. For example, a desired number of cameras may be mounted to glasses, a visor or other head-mounted structure in a known and fixed relationship to one another. In some cases, cameras that capture depth information may be used. Image acquisition devices for obtaining image data of a user's environment may be of any suitable type, and may include photoconversion devices, such as active pixel sensors, charge coupled devices (CCDs), and/or complementary metal-oxide semiconductor (CMOS) devices, etc. Image acquisition devices may include monoscopic and/or stereoscopic cameras.

According to some embodiments, one or more image acquisition devices may acquire images and/or video in synchronization with one another, such that images and/or video frames captured by image acquisition devices at the same time are also received by components of system 100 at the same time. Alternatively, images and/or video frames may be provided unsynchronized but with associated timestamp data or other data that facilitates determination of times at which the image and/or video frames were captured by image acquisition device.

According to some embodiments, image acquisition module 120 comprises multiple cameras that capture images of the same object(s) from multiple directions. As multiple users each having multiple cameras navigate a similar or same path or portions of a similar or same path in a space, an image matching database that stores images captured by the users (and/or features of the images) may provide even greater correlation with query images (or features of the query image) than would be produced from the same users having single camera configurations.

Independent of the number and/or configuration of the image acquisition devices used, image acquisition module 120 is configured to acquire image data that can be further processed by other components of the navigation system to determine a location and/or trajectory of the user, update or expand a repository or library of image data, etc., as discussed in further detail below. For example, odometry module 110 and/or image analysis module 130 may receive image data acquired by image acquisition module 120. According to some embodiments, a subset of image data acquired by image acquisition module 120 may be provided to one or both of odometry module 110 and image analysis module 130. This may include selecting a subset of the frames acquired by the image acquisition module to be provided. For example, where image acquisition unit 120 acquires 15 frames per second, this image data may be provided unaltered to odometry module 110 whereas only 1 of the frames captured each second may be provided to image analysis module 130. This may be beneficial, for example, if one or both of odometry module 110 and image analysis module 130 are configured to process image data at different rates.

As discussed above, image data acquired from the environment may be analyzed to determine location information regarding the navigation system (e.g., to determine the location of a user of the navigation system). For example, in the exemplary navigation system 100 illustrated in FIG. 1, image analysis module 130 may be configured to receive image data from image acquisition module 120 and match the image data to previously acquired image data to determine the location and/or orientation from which the image data was acquired. For example, one or more features of the image data may be identified and compared to features of image data previously acquired for which the location and/or orientation of acquisition is known. A match between features of the current and previously acquired image data provides an indication that the current image data was obtained from a similar or same location and/or orientation as the previously acquired image data. Accordingly, a match (e.g., according to a predetermined similarity criteria) provides an estimate of the location and/or orientation from which the current image data was acquired, and consequently the location and/or orientation of a user wearing or holding the image acquisition module 120.

Features identified in image data on which matching is performed may include any one or more features that facilitate robust and accurate matching. Features that may be suitable for performing matching between currently acquired image data and previously acquired image data may include, but are not limited to, simple features (i.e., points) and complex features such as edges (e.g., a plurality of connected edge points), corners, curves, intensity patterns in the image data such as color patterns, texture patterns, 3D surface patches, etc. Features may be identified in image data using any suitable imaging processing techniques including, but not limited to, one or any combination of filtering, pattern matching, statistical analysis, or any other suitable technique or combinations thereof.

As discussed above, image analysis module 130 may perform image matching of query image data to previously acquired image data to facilitate determining the location and/or orientation from which the query image data was acquired. In particular, features identified in the query image data may be compared to features identified in the previously acquired images. According to some embodiments, the previously acquired image data is stored in a repository accessible by the navigation system and may include the previously acquired images, the features identified in the previously acquired images or both. Storing the features without the corresponding images may reduce the storage requirements of a repository of reference image data of a space that can be accessed to determine location based on matching newly acquired image data to that stored in the repository. The image data stored in the repository (e.g., identified features, images or both) may have associated information identifying the location and/or orientation at which the image data was captured. Accordingly, when newly acquired image data matches (e.g., according to desired matching criteria) previously acquired image data (e.g., via feature matching), the location and/or orientation at which the newly acquired image data was captured (and thus the current location and/or orientation of the user) can be estimated based on the location/orientation information associated with the previously acquired image data.

For example, image matching performed by image analysis module 130 may produce an N-best list of closest matches between previously acquired image data and newly acquired image data, along with the corresponding match scores. The closest matching image data may be used to estimate the location and/or orientation of a user of navigation system 100, or the location and/or orientation of the user of navigation system 100 may be estimated by considering multiple matches (e.g., location and/or orientation of the user may be estimated by interpolating location/orientation information associated with multiple matches in the N-best list). The location and/or orientation of the user may be estimated by assigning the location and/or orientation associated with matched image data, or the location and/or orientation of the user may be computed based on differences in appearance of the features in the newly and previously acquired images. For example, a transformation from features in the newly acquired image data and previously acquired image data may be determined and the location and/or orientation of the user computed based on the transformation. Other techniques for estimating the location and/or orientation of the user from matched image data may be used, as the aspects are not limited in this respect. In some cases, the newly acquired image data and estimated location and/or orientation resulting from matching may be stored in the repository to expand the reference image data available for estimating location and/or orientation.

As discussed above, a navigation system may include an odometry component that, using any one or combination of techniques, is configured to track the user's movements (e.g., to keep track of the user's location and/or trajectory as the user navigates through an environment). This may be achieved, at least in part, using odometry module 110 of the exemplary navigation system 100 illustrated in FIG. 1. Odometry module 110 may include a visual odometry component configured to receive image data of the user's environment from image acquisition unit 120 and determine incremental motion of the user wearing or holding an apparatus on which the image acquisition device(s) are mounted) based on the acquired image data. By examining features of the image data, a location of the imaging devices relative to a previously known location may be identified. For example, features obtained from the most recently acquired image data may be compared to features in recently acquired image data to determine how the features have moved in the image data. According to some embodiments, video streams from the one or more image acquisition devices may be compared to track features as an estimation of motion. However, other techniques capable of estimating a user's motion from a temporal sequence of image data may be used, as performing visual odometry is not limited for use with any particular technique or combination of techniques.

Odometry module 110 may include an inertial odometry component which determines incremental motion of the odometry module based on inertial data. The inertial odometry component may include any one or combination of inertial sensors, such as accelerometers, magnetometers and/or gyroscopes that detect motion of the odometry module. The odometry module may use inertial data to determine how a user of system 100 is moving. For example, the odometry module may process inertial data to identify the steps taken by a user by examining the acceleration of the odometry module over time. As a user takes steps, the acceleration measured by an accelerometer worn on the user may exhibit peak acceleration measurements generally at the same point in time during an individual's stride. Thus, the user's steps may be tracked by identifying peaks in the inertial data. Inertial data may be processed in any suitable way for analysis, including by utilizing filters (e.g., low pass) and/or Gaussian smoothing techniques to aid in the analysis of the inertial data to identify and keep track of the user's steps.

According to some embodiments, acquired inertial data may capture a direction of travel of the odometry module. For example, a three-dimensional accelerometer may be used to sense motion in three-dimensions, and/or multiple sensors having different axes of inertial sensitivity may be combined to indicate the direction of movement of the user. Additionally, or alternatively, the odometry module (or other component of system 100) may include a compass such that a direction of travel may be identified by determining a direction in which a user is facing when motion is detected.

Navigation system 100 may be configured or calibrated for a particular user by providing the specific step size of a given user to facilitate more accurate distance estimation based on detected steps, and in the absence of such calibration information, may use a typical or average step size of a person as a default to determine the distance covered per step. Accordingly, the odometry module 110 may detect steps taken by the user and, based on a stored step size of the user (or a default step size), may estimate a distance traveled by the user.

Odometry module 110 may combine inertial odometry data with visual odometry data, including but not limited to those examples described above. The data may be combined to produce a more accurate estimate of motion of the odometry module than may be determined using either of the odometry components alone. However, it should be appreciated that inertial-based and/or visual odometry may be used separately, alone, or in any combination.

As discussed above, navigation system 100 also includes audio interface 180 configured to receive spoken input from a user of system 100 and produce audio feedback to the user.

Audio interface 180 may include a microphone (e.g., a headset microphone, etc.) and/or a speaker (e.g., conventional headphones, bone conduction headphones, etc.). Spoken input from a user may be received and speech recognition performed to identify the content of the utterance received from the user. In some embodiments, audio interface 180 is configured to recognize a list of preconfigured commands that allow a user to request directions, annotate their surroundings, request help, indicate they wish to stop receiving directions, place the system in a stand-by mode, shutdown the system, etc. For example, a "locate" keyword may be used to request directions, such as by a user speaking "locate a bathroom," "locate the exit," "locate the radiology department," etc.

According to some embodiments, a keyword is used to activate the system to receive further spoken input. To avoid conversational speech of a user from inadvertently providing input to the system, the keyword may be required as input before the system attempts to identify subsequent spoken commands. For example, a user may say the name of the system, e.g., "BlindFind," followed by one or more commands.

Audio interface 180 may produce feedback to a user by, for example, generating synthesized speech using text-to-speech techniques. Directions to a destination or other feedback may be provided, at least in part, by speech output using a speaker of audio interface 180. Producing audio output via bone conduction headphones may allow a user to continue to utilize their hearing for other common tasks such as conversation, obstacle detection, etc.

According to some embodiments, a user may provide an annotation to be associated with their location by speaking into audio interface 180. The annotation may, for example, indicate something about the surroundings of the user, such as that the user is at a bathroom entrance, or that the user has encountered an obstacle that was not indicated or represented in the current map information. Annotations to a map may be associated with a location and shared with other users (e.g., by uploading the annotated map to a repository) so that the community of visually impaired users may benefit from increasingly information rich maps of navigable spaces.

Map module 150 may be configured to create, update and/or obtain maps that are each associated with a particular location. Some locations may include multiple maps, such as if a location has multiple floors. In such cases, the multiple maps may include connection points to the other maps for the location (e.g., at stairways, elevators, etc.) so that a user may be directed from one map to another. Maps may be stored in any suitable location capable of being accessed by map module 150, including but not limited to, in computer readable media of the map module, in computer readable media of system manager 140 and/or in database 195.

A map may generally provide information about a location that has been previously established and may be represented in any number of suitable ways. For example, a map may be an undirected graph containing nodes that represent known locations, wherein each node includes any one or combination of: location, references to neighboring or adjacent nodes, annotations (e.g., text annotations, audio annotations, and/or image annotations, etc.), image data associated with the node, a timestamp indicating when the node was created, and/or a list of connecting links. A map may further include edges indicating a walkable path between two nodes, and/or may include 3-dimensional data indicating both a 2-dimensional configuration of a location (e.g., a floor plan) and information regarding heights of objects or features within the location. A user's position within a map may be identified based, for example, on a result of performing image matching of images captured by an image acquisition device of the user with previously captured images at a location). Additionally, or alternatively, a map may be updated by a user based on movement of the user through a space identified as corresponding to the map (e.g., if the user identifies a new route through the space and/or a new location in the space). Examples of identifying and updating maps are discussed below in relation to FIGS. 9 and 10.

When a map is available for a given location and the user's position within the map has been identified, the user may request directions to any known location on the map. When the destination on the map is identified, a path (e.g., a sequence of nodes) may be generated by navigation module 160 to guide the user to the destination in relatively small increments (e.g., from each node in the sequence to the subsequent node). The navigation module may obtain orientation information from the image analysis module and/or may use compass data (e.g., from system manager 140 or otherwise) to determine the direction the subject is currently facing. The navigation module may then publish a sequence of commands indicating which direction the subject needs to move to reach the next node in the path from origin to destination, where the commands may be dynamically updated based on the user's progress as the user follows the directions (e.g., the nodes in the path may be altered, adjusted or replaced should the user deviate from the prescribed course). The navigation commands may be provided to haptic device 170 to be rendered as haptic gestures and/or to audio interface 180 to provide audible directions (e.g., "walk forward," "turn left," "take ten steps forward and turn right," etc.) that guide a user to a destination.

As discussed above, navigation system 100 may also include haptic device 170, which may be implemented as a wearable and/or carryable device that includes one or more haptic feedback components which may be organized in one or two dimensional arrays, and configured to produce one or more haptic gestures. A "haptic gesture" refers herein to activation of one or more haptic feedback components in a manner that conveys to the user a navigation instruction. A haptic gesture may include activation of a single haptic feedback component (e.g., a vibrating component) to indicate a simple navigation instruction (e.g., to indicate a direction in which the user should turn), or may include activation of a combination of haptic feedback components to convey more complex navigation instructions (e.g., to instruct the user to turn-around, to instruct the user that stairs are to be ascended/descended, etc.). By using haptic device 170, a visually impaired user of navigation system 100 may accordingly receive non-audible guidance to a destination by appropriately responding to a sequence of haptic gestures, thus allowing the user's sense of hearing to remain focused on other tasks critical for the visually impaired or tasks that the visually impaired have become accustomed to performing in reliance on hearing.

As one example, haptic device 170 may include a haptic vest having haptic feedback components in the front, sides and rear, and a control mechanism configured to activate the haptic feedback to render desired haptic gestures to the wearer of the vest. Haptic device 170 may include a haptic belt having a prescribed number of haptic feedback components (e.g., vibrators) distributed around the belt to convey navigation instructions by rendering appropriate haptic gestures. As another example, haptic device 170 may include a haptic band to be worn on the arm, for example, the forearm or worn on any other part of the body. It should be appreciated that the frequency, intensity, sequence, etc. with which haptic feedback components are activated, alone or in any combination, may be utilized to form a haptic gesture, which may include direction, speed, starting, stopping, turning around, arrival at a destination, warning of substantial deviation from a path, indication to ascend or descend stairs, warnings or indications of other types, etc. As such, navigation instructions that range in complexity from the very simple to the very complex may be conveyed via haptic device 170.

System manager 140 may be configured to monitor and control one, multiple, or all of modules 110, 120, 130, 150, 160, 170. It may be configured to launch these modules in the system and/or shut them down should they become unresponsive. System manager 140 may additionally communicate with server 190 and database 195 via any suitable wired and/or wireless connections. As discussed above, system manager 140 may include a compass component. According to some embodiments, system manager 140 may include a GPS, which may aid in ascertaining a coarse location of a user (e.g., to localize image analysis), may be used alone to determine the user's location and/or may be used to identify one or more maps that may potentially be associated with the user's location.

The system manager 140 may operate in one of a plurality of modes at any given time, which may affect which modules are active and thereby which types of input and/or output may be received and/or produced by the system, respectively. According to some embodiments, the system manager may operate in a passive mode in which the system is powered on but is not being used. This mode may be beneficial, for example, when the system is receiving data from a remote source, such as server 190. According to some embodiments, the system manager may operate in an explorer mode in which a user is moving around and is creating tracks, but is not using the system for navigation. In the explorer mode, for example, the image acquisition module may acquire image data of a space and the image analysis module may identify and store features of the acquired image data. The acquired image data and/or features extracted therefrom may be uploaded to a remote location so that subsequent visitors to the space may be able to request directions to a destination and utilize the image data to determine location and/or to facilitate navigating the space. According to some embodiments, the system manager may operate in a navigation mode in which the system is providing directions to a destination, as discussed above. In some modes, the system may coordinate movements of multiple users each having a navigation system.

It should be appreciated that a system to facilitate visually impaired navigation may include fewer or more modules than depicted in illustrative system 100. Additionally, or alternatively, functionality described above may be distributed over one or any combination of modules and need not follow the architecture described above or in further detail below as the implementation depicted in FIG. 1 is merely one example of how a navigation system for the visually impaired may be implemented.

Figure 2A:
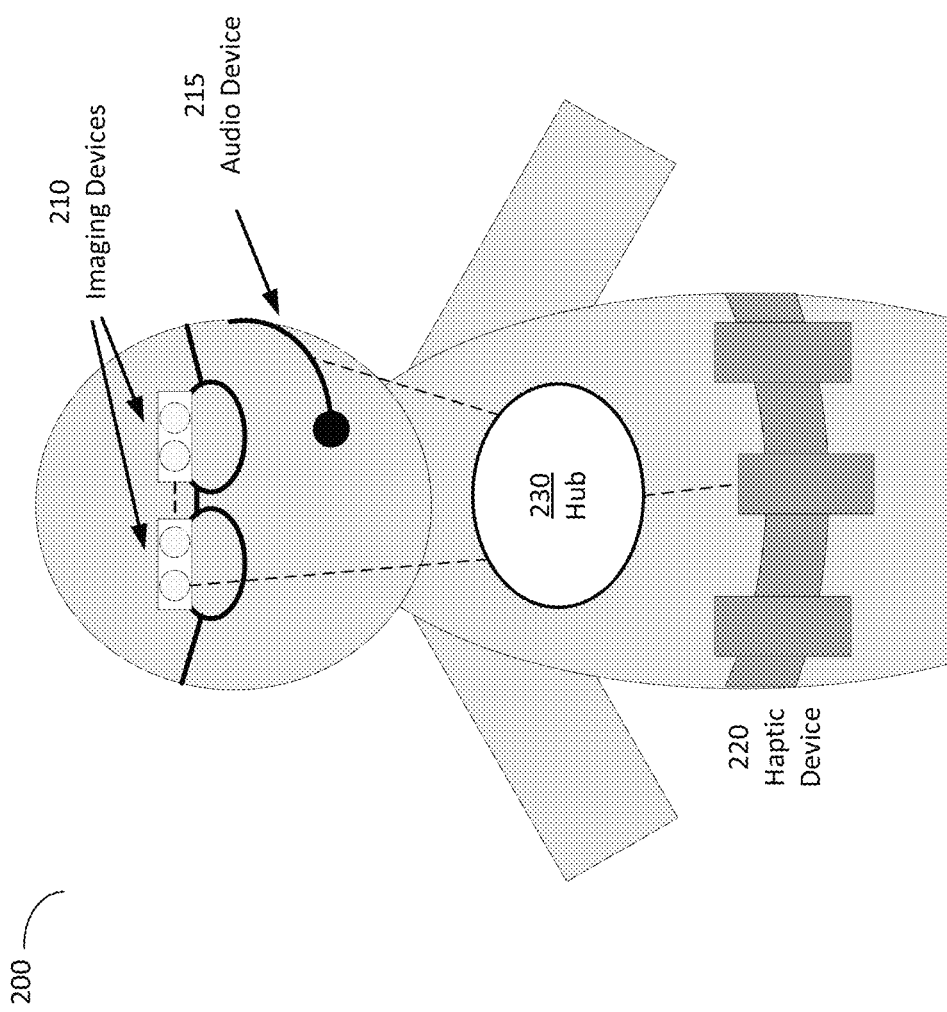
FIGS. 2A-B each depict an illustrative implementation of a system suitable for practicing aspects of the invention, according to some embodiments.

FIG. 2A depicts an illustrative navigation wearable by a visually impaired user, in accordance with some embodiments. Navigation system 200 includes imaging devices 210, audio device 215, haptic device 220 and hub 230. Each of these elements of navigation system 200 are wearable and may communicate with each other via any suitable wired and/or wireless technique (for which connections are illustrated in the figure using dashed lines).

In the example of FIG. 2A, a pair of imaging devices 210 are mounted to eyewear worn by a user, each imaging device 210 comprising two respective stereo cameras. Navigation system 200 also includes audio device 215 configured to be worn by the user and that receives audio input via a microphone and outputs audio to the user via a speaker placed in or near the user's ear and/or using a bone conduction device. Haptic device 220 is adapted to be worn as a belt that comprises multiple haptic feedback components (e.g., haptic feedback components that can deliver vibrations that can be felt by the wearer), of which three are shown in FIG. 2A at the front of the belt.

System 200 further comprises hub 230 that generally manages interactions between various components in the system, and includes or implements one or more of the system modules. Hub 230 may be worn anywhere on the user's body, or may be provided within or attached to an item of clothing worn by the user, such as within a backpack or clipped to a belt. Hub 230 includes one or more processors and/or components that allow a user to perform navigation actions as described herein. For example, a user may acquire images via imaging devices 210, which may be provided to hub 230 to perform image matching and/or visual odometry, as described above. Additionally, or alternatively, a user may speak commands into audio device 215, which may provide a signal to hub 230 such that commands are interpreted and a suitable response is produced (e.g., producing directions to a destination via haptic device 220 and/or audio device 215). In the context of system 100, hub 230 may include odometry module 110, image analysis module 130, system manager 140, maps module 150 and/or navigation module 160, and may additional comprise components of image acquisition module 120, haptic device 170 and/or audio interface 180. Hub 230 may communicate with a remote server and/or database (e.g., such as server 190 and/or database 195) using one or more suitable wireless communication techniques.

Figure 2B:
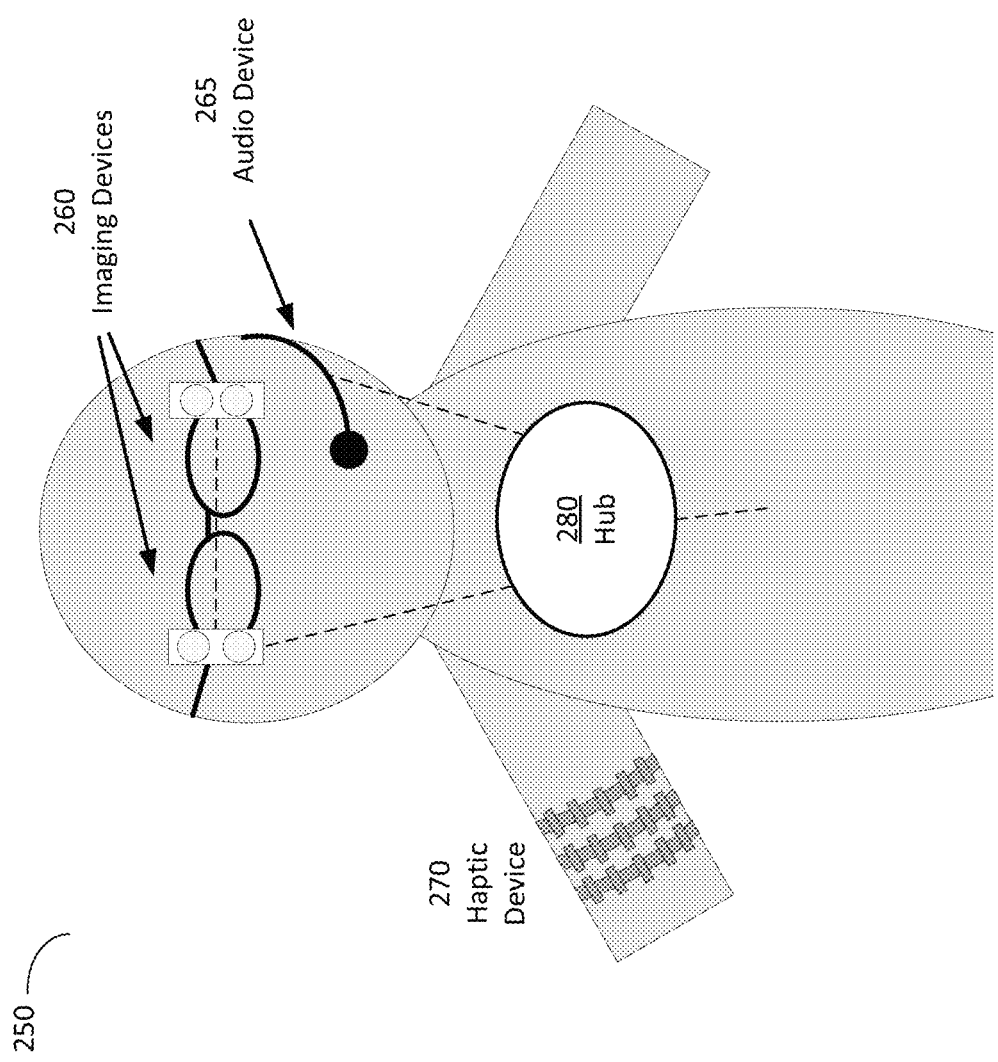

FIG. 2B depicts a second illustrative navigation wearable by a visually impaired user, in accordance with some embodiments. Navigation system 250 includes imaging devices 260, audio device 265, haptic device 270 and hub 280, may be similar to components discussed in connection with FIG. 2A. In particular, each of these elements of navigation system 200 are wearable and may communicate with each other via any suitable wired and/or wireless technique (for which connections are illustrated in the figure using dashed lines). In the example of FIG. 2B, haptic device 270 is worn on the arm of the user. A haptic device worn on the arm may provide different haptic stimulus to the user than one worn on the waist, and thereby may have advantageous in communicating certain information to the user.

In some cases, both haptic devices 220 and 270 may be worn by a single user to receive haptic feedback from either or both devices at any given time. Additionally, a haptic device 270 can be worn on both arms so that directional information can be conveyed by activating the appropriate haptic device. It should be appreciated that haptic device can be used in any combination to achieve desired navigational gestures to guide the wearer. FIG. 2B also illustrates a different configuration for the cameras on imaging device 260, which configuration is described in further detail in connection with FIG. 3B.

Figure 3A:
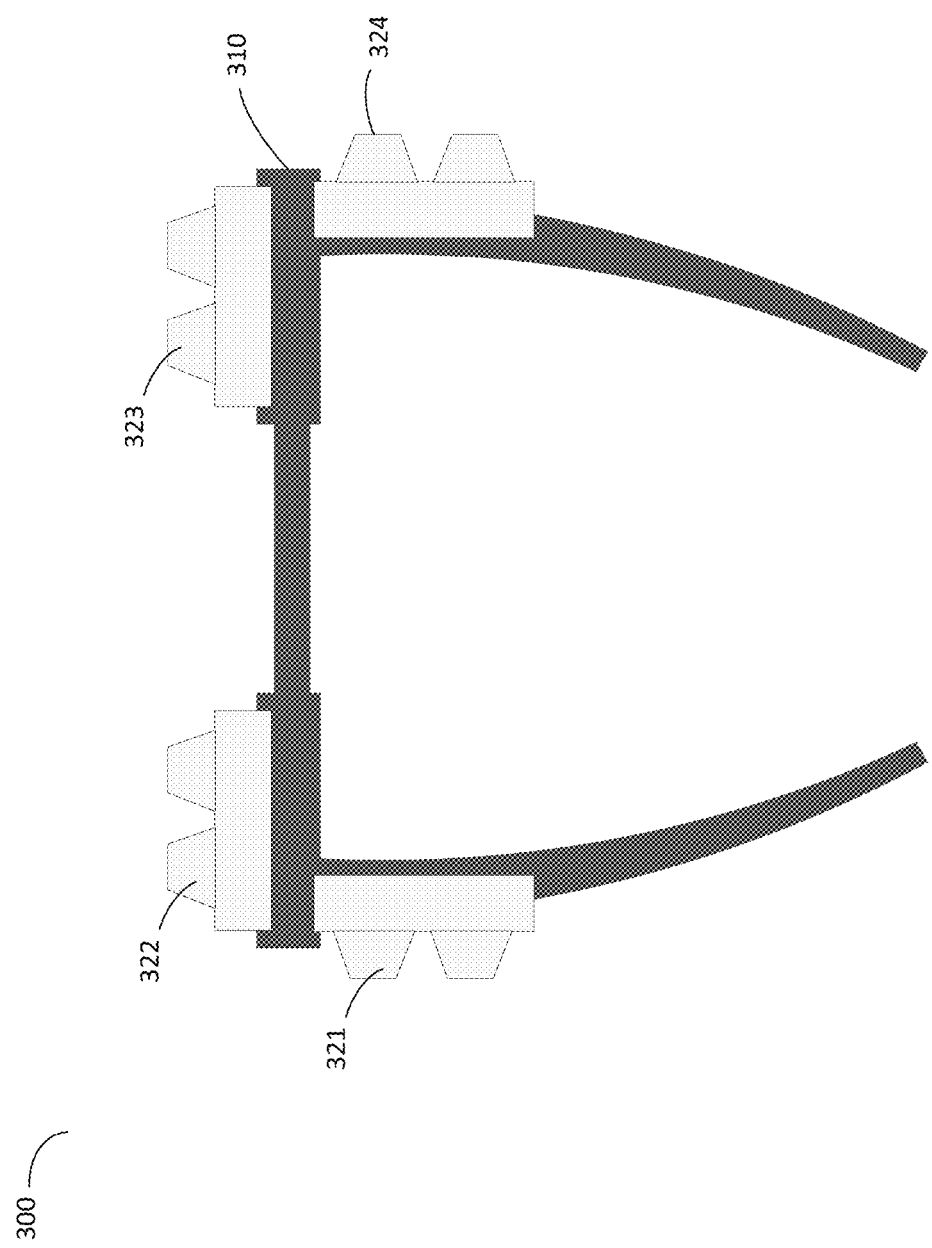
FIGS. 3A-B each depict a wearable camera array, according to some embodiments.

As discussed above, determining the location of a user and/or tracking the movements of a user may be performed using image data acquired from the user's environment. The inventors have appreciated that certain arrangements of image acquisition devices enable acquisition of image data that facilitates accurate and robust determination of user location and/or orientation. FIG. 3A depicts a wearable camera array arranged in a configuration suitable for performing image matching techniques described herein, in accordance with some embodiments. In the example of FIG. 3A, wearable device 300 includes eyewear 310 having mounted thereon four stereo cameras 321, 322, 323 and 324, for a total of eight image acquisition devices. Cameras 322 and 323 face in the forward direction and cameras 321 and 324 face a peripheral direction away from the sides of the wearer's head.

The cameras mounted to wearable device 300 may be attached at known locations in known spatial relationships to one another such that the camera parameters of acquired image data is known. Providing multiple cameras at fixed and known locations may improve image matching processes by providing multiple views of the same scene from known respective perspectives. When performing image matching using curves, for example, stereo image data containing curves of interest provides sufficient information to perform accurate and robust matching of curves detected in image data acquired of the user's environment with curves obtained from previously acquired image data of the environment.

According to some embodiments, wearable device 300 may include one or more cameras that measure depth information, such as RGBD cameras (e.g., those found in the Microsoft Kinect™ device). Such camera(s) may assess the depth of a scene in which the wearable device is located. Where other, non-depth sensing cameras are utilized, the output of depth-sensing cameras and non-depth sensing cameras may be integrated together.

It should be appreciated that a wearable device may include any number of cameras in any arrangement, for example, arranged according to any of the following configurations: six unsynchronized (~20 ms delay) frames (640×480) at 15 frames per second (fps) (i.e., using six of the cameras to produce video frames at 15 fps, thereby capturing 90 frames in each second in total); four unsynchronized (~20 ms delay) frames (640×480) at 15 fps; two nearly synchronized (~5 ms delay) frames (640×480) at 15 fps; one (640×480) frame and one (640×480 depth) frame synchronized at 60 fps; six synchronized frames from cameras (640×480) at 30 fps; four synchronized frames from cameras (640×480) at 30 fps.

While according to some embodiments, point matching techniques may be utilized, the inventors have appreciated that matching point features in image data may limit the robustness and accuracy of the resulting matches. To address this potential deficiency, some embodiments include matching curves, which may provide a more suitable representation of features to accurately and robustly match features in image data to facilitate determining the location of a user. The term "curve" refers herein to a representation of a feature using more than a single point to represent the feature, and should be understood to include representations of edges, functions, geometric primitives, etc.

Figure 3B:
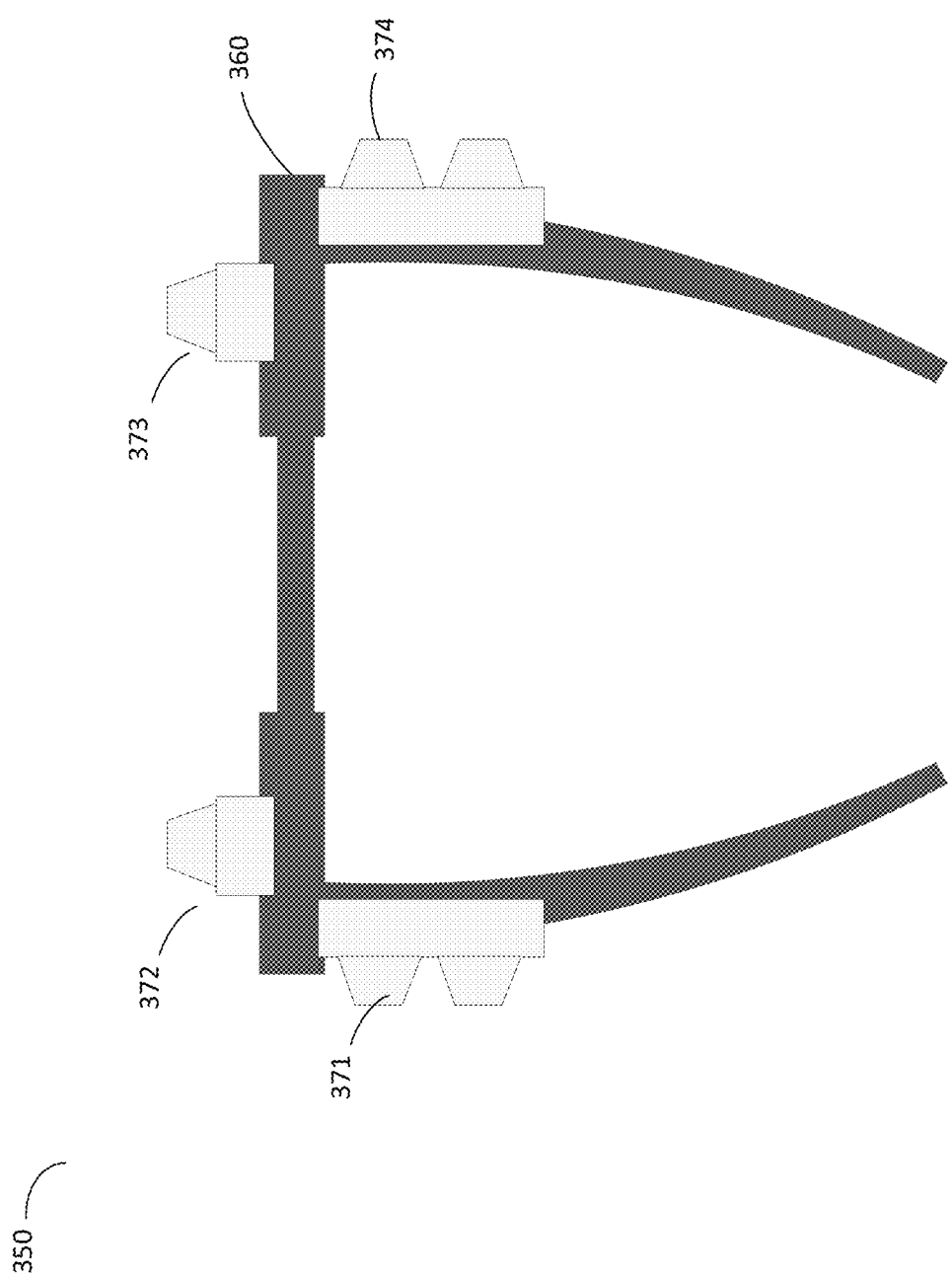

FIG. 3B depicts an alternate wearable camera array arranged in a configuration suitable for performing image matching techniques described herein, in accordance with some embodiments. In the example of FIG. 3B, wearable device 350 includes eyewear 360 having mounted thereon four stereo cameras 371, 372, 373 and 374, for a total of eight image acquisition devices. Stereo cameras 372 and 373 face in the forward direction and are oriented vertically such that one of the pair of cameras sits above the other camera (both cameras are not visible in the figure due to the one camera being located behind the other in the depicted, though the arrangement can be seen in FIG. 2B). Cameras 371 and 374 face a peripheral direction away from the sides of the wearer's head.

Figure 4:
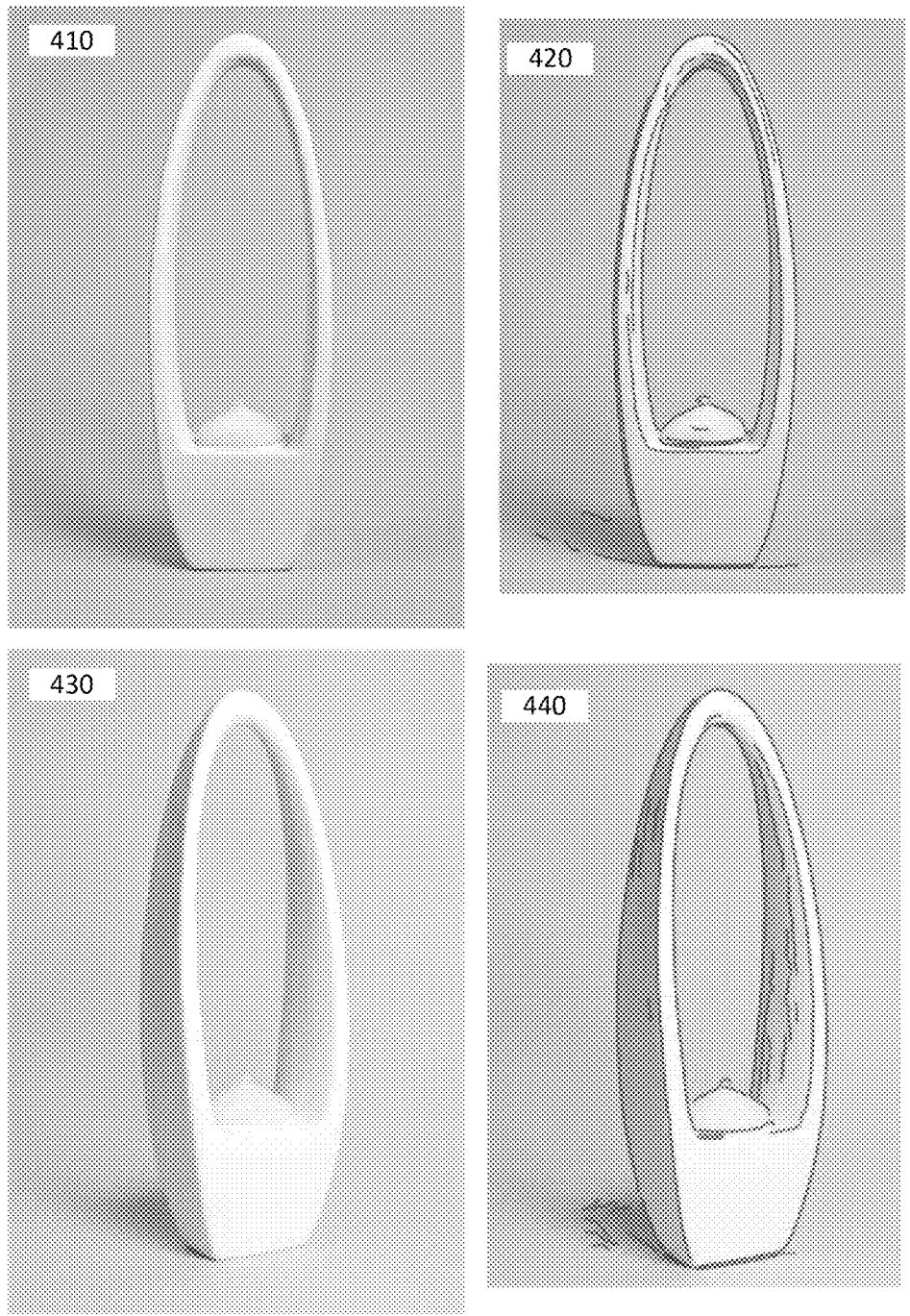
FIG. 4 illustrates an example of identifying features of an image by detecting edges, according to some embodiments.

FIG. 4 illustrates an example of identifying features of an image by detecting curves, in accordance with some embodiments. As discussed above, features may be identified from image data using any suitable technique, which may include the identification of curve features. In FIG. 4, image data of the same object viewed from different angles is shown by image data 410 and 430. Curves identified in the image data via feature detection are overlaid on the image data as shown by image data 420 and 440, respectively. The features may be identified by performing edge detection and locally connecting resulting edges to form a plurality of curves. Representing features as curves may facilitate improved matching of image data, as discussed in further detail below.

Figure 5:
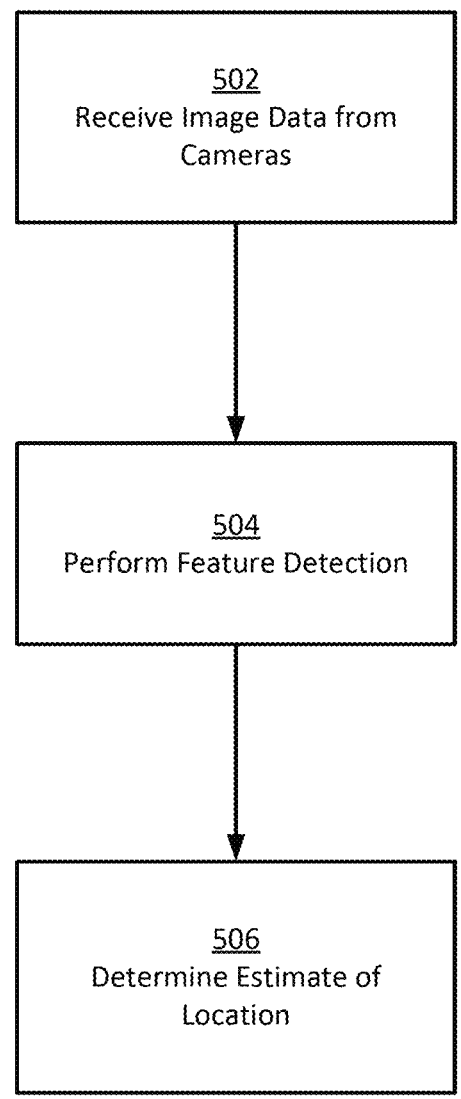
FIG. 5 illustrates a method of estimating a location using feature detection, according to some embodiments.

FIG. 5 depicts a method of estimating a location by matching features detected in image data acquired of a scene, according to some embodiments. In act 502, image data of the user's environment is received from a plurality of cameras, which may for example be worn by a user of a wearable device of the navigation system (e.g., wearable device 300). In act 504, feature detection is performed on the acquired image data. Feature detection may be performed in any suitable manner and image data acquired from multiple image acquisition devices may facilitate correlating features detected in the respective image data.

In act 506, a location of the user in the environment is estimated by comparing features detected in act 504 with features detected in image data previously acquired of the environment (e.g., stored in a library of image data corresponding to a particular space) at known locations to determine a measure of similarity or match score between the respective sets of image data. The locations associated with previously acquired image data that produce high match scores may be used to determine the location of the user. While point features may be used in some embodiments, as discussed above, the inventors have appreciated that using curve features instead of point features can resolve ambiguities that can lead to sub-optimal matches when using point features, though in some embodiments point features may be used.

Figure 6:
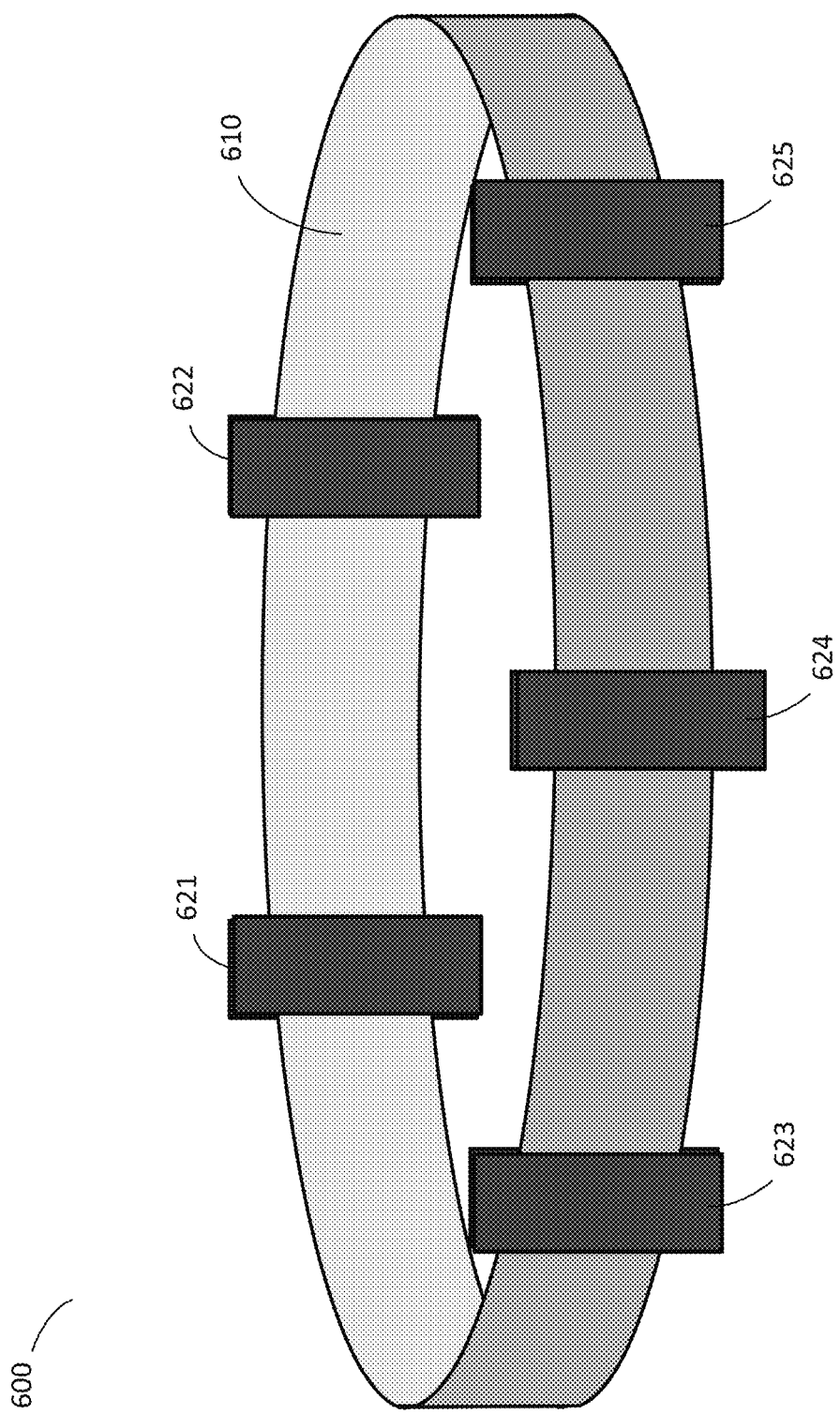
FIG. 6 depicts a wearable haptic feedback device, according to some embodiments.

FIG. 6 illustrates a wearable haptic feedback device, according to some embodiments. As discussed above, a wearable haptic feedback device may produce one or more haptic gestures to convey a navigation instruction to a wearer of the device. Haptic feedback device 600 includes belt 610 to which haptic components 621-625 are mounted. Each of haptic components 621-625 may be configured to be activated independently to provide a variety of possible haptic gestures. Haptic components 621-625 may be, for example, components that vibrate and navigation instructions may be conveyed by causing specific patterns of the haptic components to vibrate. Additionally, other properties of the haptic component may be used to convey navigation information such as frequency, amplitude or intensity, and/or duration of the signals produced by the haptic components.

To assist in conveying navigation instructions to a user, haptic feedback device 600 may be configured to produce haptic gestures that indicate to the wearer to move forward, forward-right, forward-left, backwards, and to stop. By activating a suitable combination of the haptic components 621-625, each of these haptic gestures (and indeed any haptic gesture conveying any desired navigation instruction) may be provided to a user in an intuitive fashion. For example, the forward haptic gesture may be signaled by activating each of haptic components 623-625; the forward-right haptic gesture may be signaled by activating haptic component 623 only; the forward-left haptic gesture may be signaled by activating haptic component 625 only; the backwards haptic gesture may be signaled by activating each of haptic components 621 and 622; and the stop haptic gesture may be signaled by activating all of haptic components 621-625. In some cases, a "turn" instruction may be indicated by producing a rotating haptic feedback motion in the direction of the turn.

It should be appreciated that haptic gestures may include any combination of activating haptic components 621-625 to convey one or more navigation instruction and/or to convey other information to the wearer of haptic feedback device 600. Furthermore, haptic components included in the haptic feedback device 600 may provide any one or combination of types of feedback, including force, vibration and/or acoustic information (e.g., via bone conduction) to assist in conveying navigation instructions (or other related information) to the wearer.

Haptic components suitable for use in illustrative haptic feedback device 600 may include any components that may be operated to apply vibration, force or any other suitable haptic or tactile input to a wearer of the device. For example, a haptic component may include one or more actuators that, when actuated, apply a force to a wearer and/or vibrate in such a way so as to be felt by the wearer. Additionally, or alternatively, various acoustic signals may be employed such that a wearer of a haptic feedback device senses activation of one or more haptic components of the device by sensing an acoustic wave produced by the component(s).

While a haptic feedback device, such as haptic feedback device 600, may be utilized in the navigation system for the visually impaired, haptic feedback device may additionally or alternatively be worn by sighted users to receive instructions for navigation. For example, a wearable haptic feedback device may be worn by a sighted user in an unfamiliar location, and/or a location having a complex layout, such as a hospital, office building, conference, fair, museum, and/or warehouse. The wearable haptic feedback device may be activated to guide the wearer to a destination via the same mechanisms that assist the visually impaired. Additionally, or alternatively, a wearable haptic feedback device may be employed by a sighted user in an environment in which the vision of the wearer is temporarily impaired, such as in a low light and/or smoky environment. For example, a firefighter might be directed to an exit while in a dark, smoky environment of a fire by wearing a haptic feedback device such as a belt or vest and sensing haptic gestures produced by the device.

Figure 7:
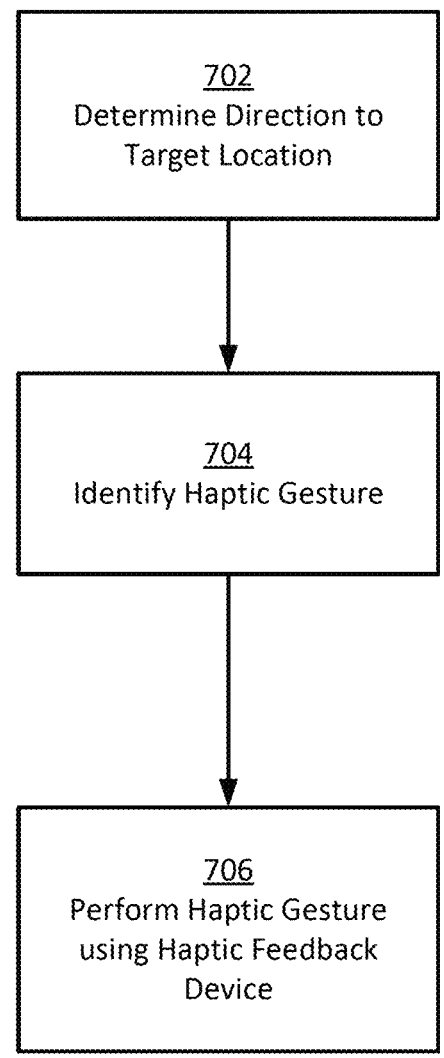
FIG. 7 illustrates a method of providing directions to a user via haptic feedback, according to some embodiments.

FIG. 7 depicts a method of providing directions to a user via haptic feedback, according to some embodiments. In act 702, a navigation instruction to be conveyed to the user is determined. For example, the navigation instruction may include the direction to a target location, which may be determined by identifying a vector in the direction of the target location from the user's current location, and determining the difference in the direction between the vector and the user's current heading. According to some embodiments, a direction to a target location may be determined at least in part by using a map on which the user's current location has been identified and that includes a target location to which the user is to be guided. The target location may be one of a series of incremental target locations along a sequence of nodes forming a path to a destination, or the target location may correspond to the destination itself. Thus, the navigation instruction may be determined, at least in part, on the direction needed to guide the user from the user's current location to the target location. Other information, such as the distance between the user's current location and the target location, may be utilized as well, as the aspects are not limited in this respect.

In act 704, a haptic gesture is identified based at least in part on the navigation instruction determined in act 702. That is, a haptic gesture adapted to convey the navigation instruction is selected for rendering to the user. For example, if the navigation instruction indicates that the target location is to the right of the user, the haptic gesture may be a gesture configured to convey to the user that they should turn to their right. In act 706, the haptic gesture identified in act 704 is rendered using a haptic feedback device, such as one worn or carried by the user, by activating one or more haptic feedback components according to the identified haptic gesture. Method 700 may then be repeated to convey navigation instructions to the user to guide the user to a desired destination.

Figure 8:
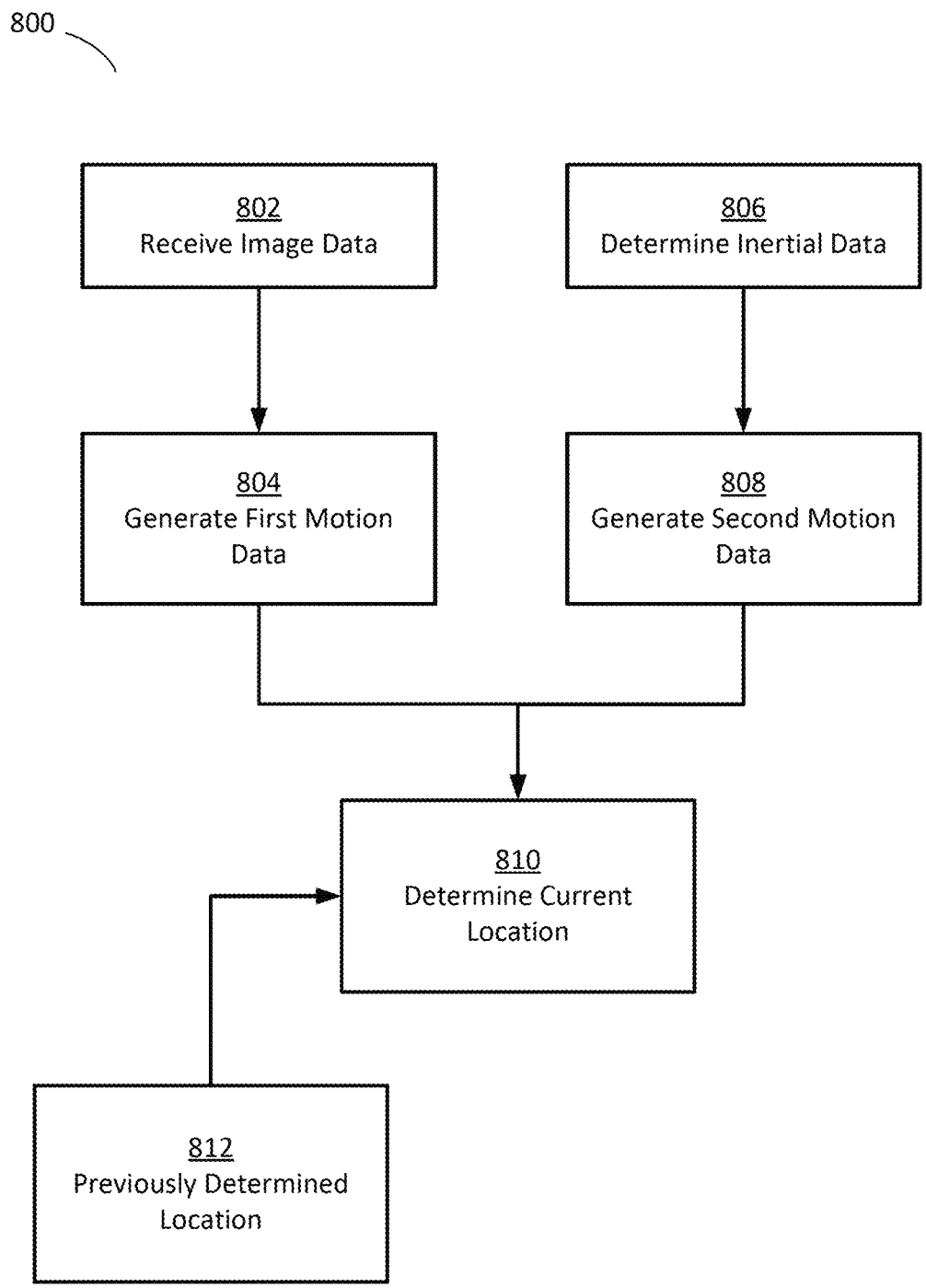
FIG. 8 illustrates a method of determining a location of user based on odometry data, according to some embodiments.

FIG. 8 depicts a method of determining a location of user based on odometry data, according to some embodiments. Method 800 may be performed to provide the location and/or orientation of the user to facilitate determining a navigation instruction to be conveyed to the user via haptic feedback (e.g., to facilitate performing method 700). As discussed above, a location of a user of a navigation device may be determined by obtaining odometry data and applying the odometry data to a previously known location and/or orientation to update the current location and/or orientation of the user. In illustrative method 800, both inertial and visual odometry data of a navigation device is shown as being obtained to track the movements of the user through a space. However, it should be appreciated that either inertial odometry data or visual odometry data may be used alone in order to track and update a user's current location and/or orientation.

In act 802, image data is received from one or more image acquisition devices. As discussed above (e.g., in connection with method 500), the location of a user may be determined based on matching features detected in image data acquired from the user's current location and features detected in previously acquired image data. Such a method may be repeated to provide continued estimates of the user's location in the environment. Image data may also be used to estimate the movement of the user by tracking how detected features change in a generally continuous sequence of image data acquired as the user moves through the environment.

In act 806, inertial data is determined from one or more inertial sensors. As discussed above, any number of inertial sensors such as accelerometers, gyroscopes and/or magnetometers may be used to generate a measure of incremental motion. The inertial data is used, at least in part, to generate additional information regarding the user's movement through the environment.

In act 810, a current location of the user of the navigation system is determined based on the data acquired in acts 804 and 806. For example, the acquired data may together indicate an estimate of how far and in what direction the user has moved relative to a previously known location, or may provide an estimate of the user's location without reference to a previously known location. The data acquired in act 804 and/or 806 may be used alone, or considered together, in determining the location and/or orientation of the user to facilitate tracking the movements of the user in the environment. It should be appreciated that data visual and odometry data may be acquired periodically (or aperiodically) at any desired interval to update the location and/or orientation of the user in a suitable manner.

Figure 9:
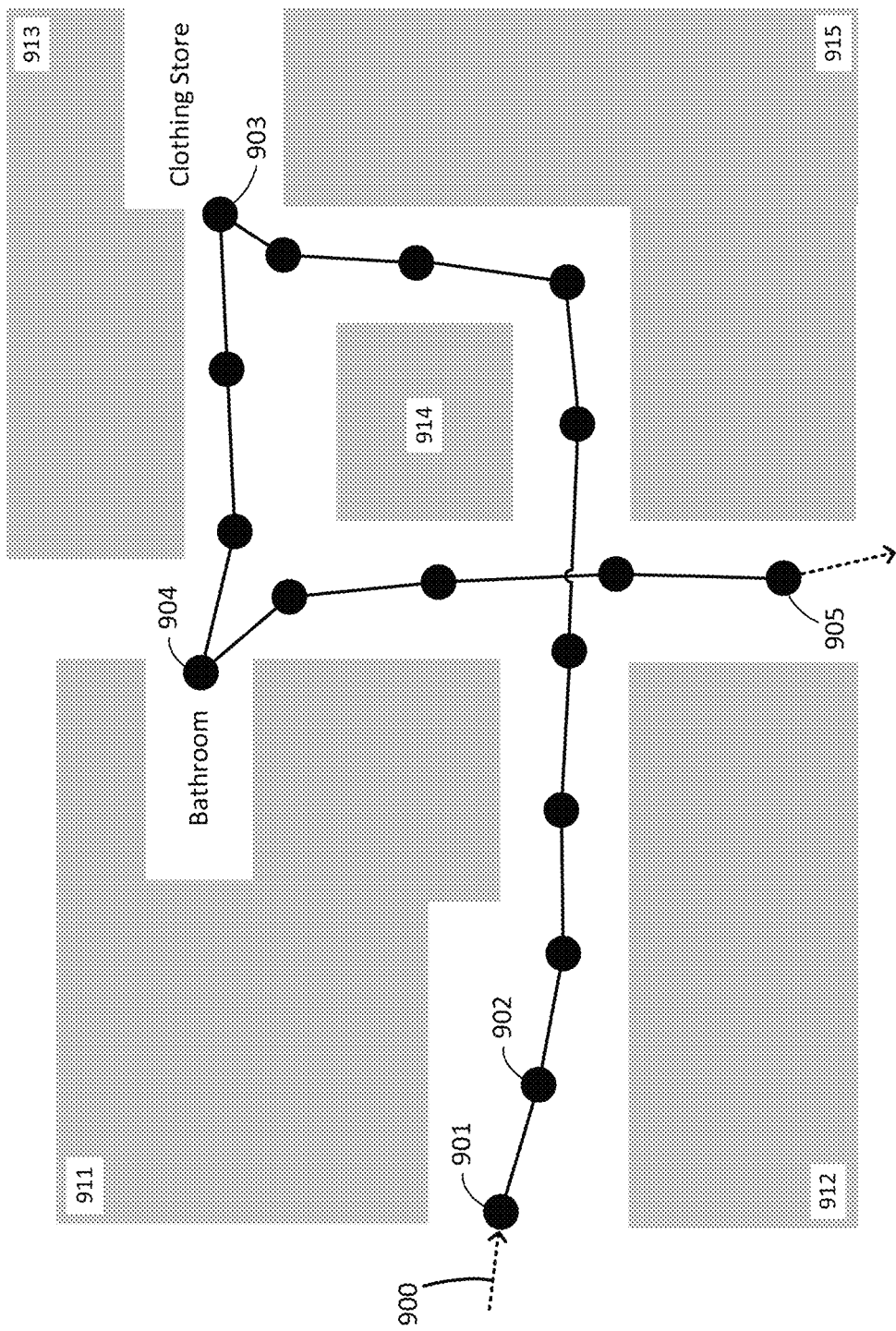
FIG. 9 depicts a track generated by a user's motion, according to some embodiments.

FIG. 9 illustrates a track generated by a user's motion, according to some embodiments. As discussed above, the position of a user of a navigation system may be determined periodically (e.g., at regular time intervals, or from time to time) and a track, which may be an undirected graph containing nodes representing the determined positions, may be created. Track 900 illustrates one exemplary track created by a user moving through a shopping mall, portions of the walls and other structures of which are represented as regions 911-915.

As the user moves through the environment, nodes (e.g., nodes 901-905) are determined and added to track 900. The lines shown in FIG. 9 connecting the nodes are provided to illustrate the path that the user takes and do not necessarily represent data that is stored as relating to the track. However, in some embodiments the map may include edges that indicate a walkable path between two nodes (e.g., to distinguish between nearby nodes having space directly between them that cannot be traversed due to a wall or other obstacle).

Track 900 includes a series of nodes that are each associated with a location and may each be further associated with image data (e.g., previously acquired images at the location) and/or annotations (audio, text, images). As the track is created, it may be saved to one or more computer readable storage media accessible to the navigation device (e.g., on-board memory, etc.). In the example of FIG. 9, the user navigates (e.g., via navigation instructions provided via a navigation system described herein, or otherwise) to node 903, which is the location of a clothing store. The user then navigates to node 904, which is the location of a bathroom, then navigates elsewhere in the shopping mall, such as to node 905, etc.

Nodes in track 900, such as nodes 901 and 902, are locations of the user that were determined while the user was moving through the shopping mall. The locations may be determined in any suitable way, such as by determining each location by performing image matching of one or more images acquired at the location (e.g., as described herein) with one or more previously captured images and/or by using odometry data (e.g., visual and/or inertial odometry data) to determine the location from a previously known location, GPS, or any other suitable technique. Any of the locations within a track may be determined using any available technique, so that, for example, some of the locations of track 900 may be determined using image matching (e.g., if suitable images for the location are available) and other locations may be determined using odometry data as being determined distances in a particular direction from a previously determined node location.

Nodes may be determined at any suitable time and/or distance interval, as there is no requirement that the nodes have a fixed spatial separation nor that they are determined at regular time intervals. A node may be determined when sufficient information has been obtained by a navigation system such that an accuracy of a location estimate is determined to be above a threshold. For example, images acquired by a navigation system may be matched, via image matching, with previously acquired images but at a level that yields some uncertainty regarding the location determined as a result of the match (e.g., only a small number of features and/or partial features are matched). A node may thereby not be determined as a result of the image matching since the node may be considered to have too great an uncertainty in its position to be recorded. Subsequent image matching may result in a higher confidence, however, leading to the position associated with that image match to be recorded as a node in track 900.

As discussed above, a navigation system may obtain maps from a repository of maps (e.g., a shared repository). According to some embodiments, one or more nodes of a track created by a user may be used to identify a map of the space that the user is navigating, and may for example result in the map being retrieved by the navigation system from repository accessible by the navigation system. In some cases, these maps may have been fully or partially created by a third party system and not by a navigation system as described herein.

For example, image matching may be performed by comparing using one or more images acquired at the node's location with images and/or features of images previously acquired at the node's location and that are associated with a location on a map. The node may thereby be identified as having a location on the map. According to some embodiments, a map may be identified by obtaining a position of the navigation device via GPS, which may establish a coarse indication of position that, while not sufficient to navigate a visually impaired user around an interior environment, may be sufficient to identify one or more maps that may be selected from a repository of maps for the user to access for said navigation. In the case of a building having multiple floors, a plurality of maps each representing a floor may be identified and one of the plurality selected based on image matching or otherwise.

Irrespective of how a map is identified, the identification of the map may enable navigation instructions to a requested destination to be provided by identifying the destination on the map. For example, the user creating track 900 may initially arrive at an entrance to a shopping mall. The user's navigation device may identify that the user is in the vicinity of the shopping mall via GPS, or otherwise, and obtain one or more maps previously created for the shopping mall. Additionally, the navigation device may perform image matching using images acquired at node 901 and node 902 as the user enters the mall, and may identify one or both of those nodes as being at the malls' entrance location (e.g., by matching features of the images acquired at the entrance with features of images previously acquired at the entrance). The appropriate map of the shopping mall floor and the user's location on the map may thereby be identified. Now, when a user requests directions to the clothing store, assuming that the map has previously been configured to include the clothing store's location, the navigation system can establish a path to the clothing store and direct the user along the path using techniques (e.g., audio feedback and/or haptic feedback) described herein or otherwise.

Irrespective of whether a user is using an identified map at their location to obtain directions, locations through which the user moves may still be identified as nodes and stored within a track, as described above. For example, even though the user may be navigating based on directions, the locations through which the user passes may not be identical to those stored in the map that provides those directions due to variations in how accurately the user follows the directions. Accordingly, a track, such as track 900, may be formed irrespective of how the user is being directed to the clothing store, which may be because their navigation system provided directions to it, though may also be because a friend is helping the user to the clothing store, etc.

When a track is created in a space and a map is associated with the space, the track may be partially or completed merged with the map, which may include adding image data acquired at one or more nodes of the map to associated nodes within the map, adding the complete track to the map, and/or updating the position of one or more nodes of the map. Tracks may be stored in a navigation device and subsequently uploaded to a repository and merged with a map at the repository.

Figure 10:
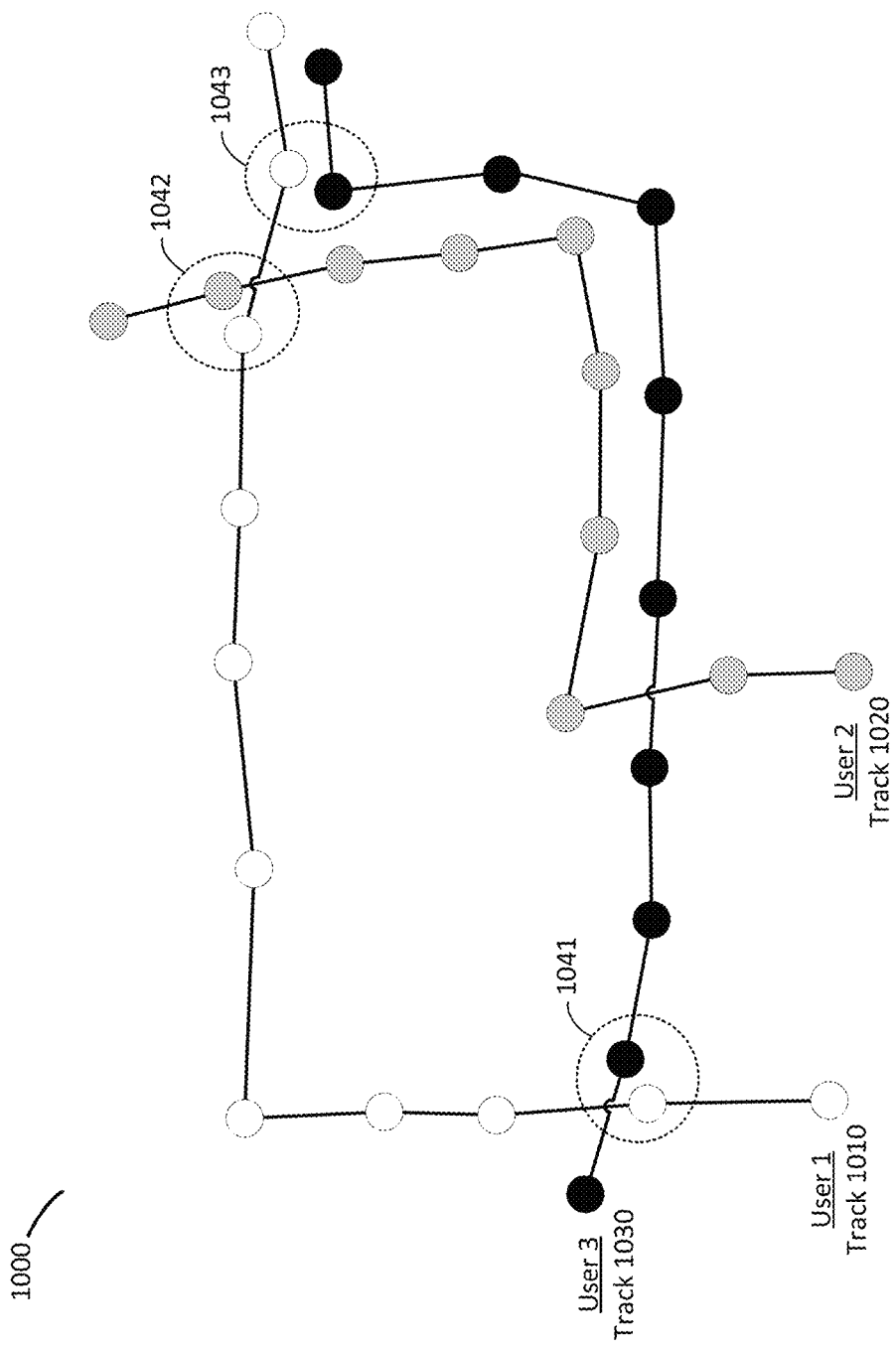
FIG. 10 depicts consolidation of track data from multiple users, according to some embodiments.

FIG. 10 illustrates merging of track data from multiple users, according to some embodiments. FIG. 10 depicts tracks created by the motion of three users, who create tracks 1010, 1020 and 1030. As discussed above, these tracks may be created when the user is receiving navigation instructions from a navigation device, or otherwise.

Nodes from different tracks may be identified as being from the same or approximately the same location by examining the determined spatial position of the nodes of the tracks. For example, nodes from track 1010 and track 1030 may be identified as being at approximately the same location, which is depicted by circled region 1041 in FIG. 10. Any data associated with the nodes within this region may be merged, such as within a map associated with the space that the three users are navigating.

According to some embodiments, images acquired by one or more users, and/or features extracted from those images, may be stored as associated with one or more locations within a map. For example, images and/or features acquired by user 1 and user 3 within region 1041 may be associated with one another in a map (e.g., a map stored in a shared repository). As discussed above, when performing image matching to determine a position of a navigation device, images acquired by the navigation device may be matched to images that were previously acquired. In the example of FIG. 10, images acquired by user 1 and user 3 in region 1041 may be stored as such previously acquired images (e.g., by uploading the images and/or features extracted from the images to a repository). It may be beneficial to store multiple images acquired at or close to a single physical location, since the images may be captured under different lighting conditions and/or at different angles, so having a range of images may increase the likelihood of successfully image matching an arbitrary image taken at the location with one of the stored images.

According to some embodiments, one or more annotations may be stored as associated with one or more locations within a map. As discussed above, a user may create an annotation by providing a suitable command to a navigation system, which may be associated with the location of the user at the time the command was provided. For example, a user may create an audio annotation at a bathroom by verbally indicating that they are at a bathroom. When a node associated with an annotation is consolidated with a map, the node with its associated annotation may be added to the map, and/or a node within the map at the same or approximately the same location as the node may be updated to include the annotation.

According to some embodiments, updating a map may comprise adding a track to the map where at least one node of the track has been identified as being at the same or approximately the same location as at least one node of the map. A map may thereby include multiple tracks that traverse the same space. For example, a map may include nodes within regions 1041, 1042 and 1043 shown in FIG. 10. By identifying nodes of tracks 1010, 1020 and 1030 as being in one of those regions, each of the tracks may be added to the map so that additional nodes within the regions, along with any images, annotations, etc. associated with those nodes, may be included within the map. Subsequent navigation of the space may thereby take advantage of all the nodes of tracks 1010, 1020 and 1030 by obtaining the updated map.

Figure 11:
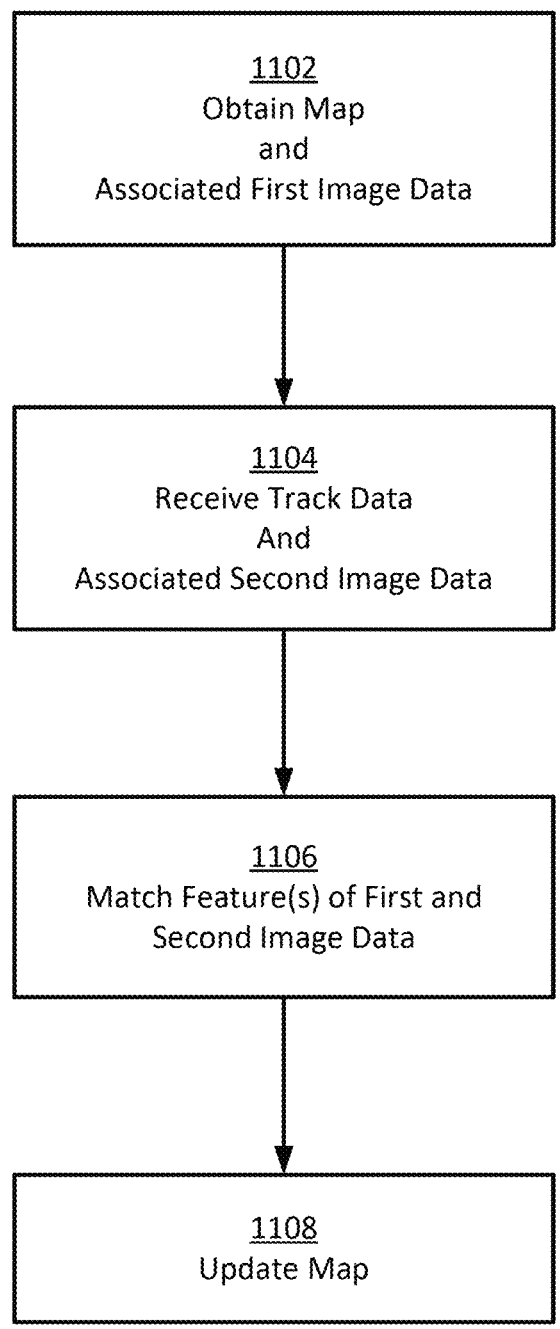
FIG. 11 illustrates a method of updating community map data, according to some embodiments.

FIG. 11 depicts a method of updating shared map data, according to some embodiments. Method 1100 may be performed by any suitable navigation system, including but not limited to systems 100 and 200 shown in FIGS. 1 and 2, respectively. Method 1100 performs a process in which a map is updated by recognizing a node in the map as being associated with a location of a node within a track using image matching.

In act 1102, a map and image data associated with at least one node of the map are obtained. The map may include any number of nodes each being associated with a spatial location. The map and image data may be obtained in any suitable way, including by downloading the map and image data from a repository, and/or by accessing the map and/or image data in one or more computer readable media of a navigation device (which may have previously been downloaded). The image data may include any number of images in any suitable format, and/or may include any number of features extracted from any number of images.

In act 1104, track data and image data associated with at least one node of the track are received. The track data may include any number of nodes each being associated with a spatial location, and may be obtained through any suitable technique, including the techniques of determination the location of a navigation device described herein. The image data may be acquired by one or more imaging devices, where the image data represents one or more images and/or features of images acquired at the location of a node associated with the image data.

In act 1106, features of the image data obtained in act 1102 and received in act 1104 are compared and at least one matching feature is identified. Where images were received in act 1102 and/or act 1104, act 1106 may comprise extraction of one or more features from the images for comparison. Act 1106 may thereby determine that at least one node of the track is at the same or approximately the same spatial location as at least one node of the map by identifying one or more matching features of images acquired at the respective node locations.

In act 1108, the map is updated based on the identified matching feature(s). According to some embodiments, updating the map may include adding all nodes of the track to the map. Additionally, or alternatively, one or more nodes of the map may be modified based on the node or nodes of the track that were matched to them in act 1106. For example, where a node of the track matches a node of the map in act 1106, images and/or annotations associated with the node of the track may be added to the map and associated with the matching node of the map. However, any suitable modification of the map based on the track nodes and associated data may in general be performed.

Figure 12:
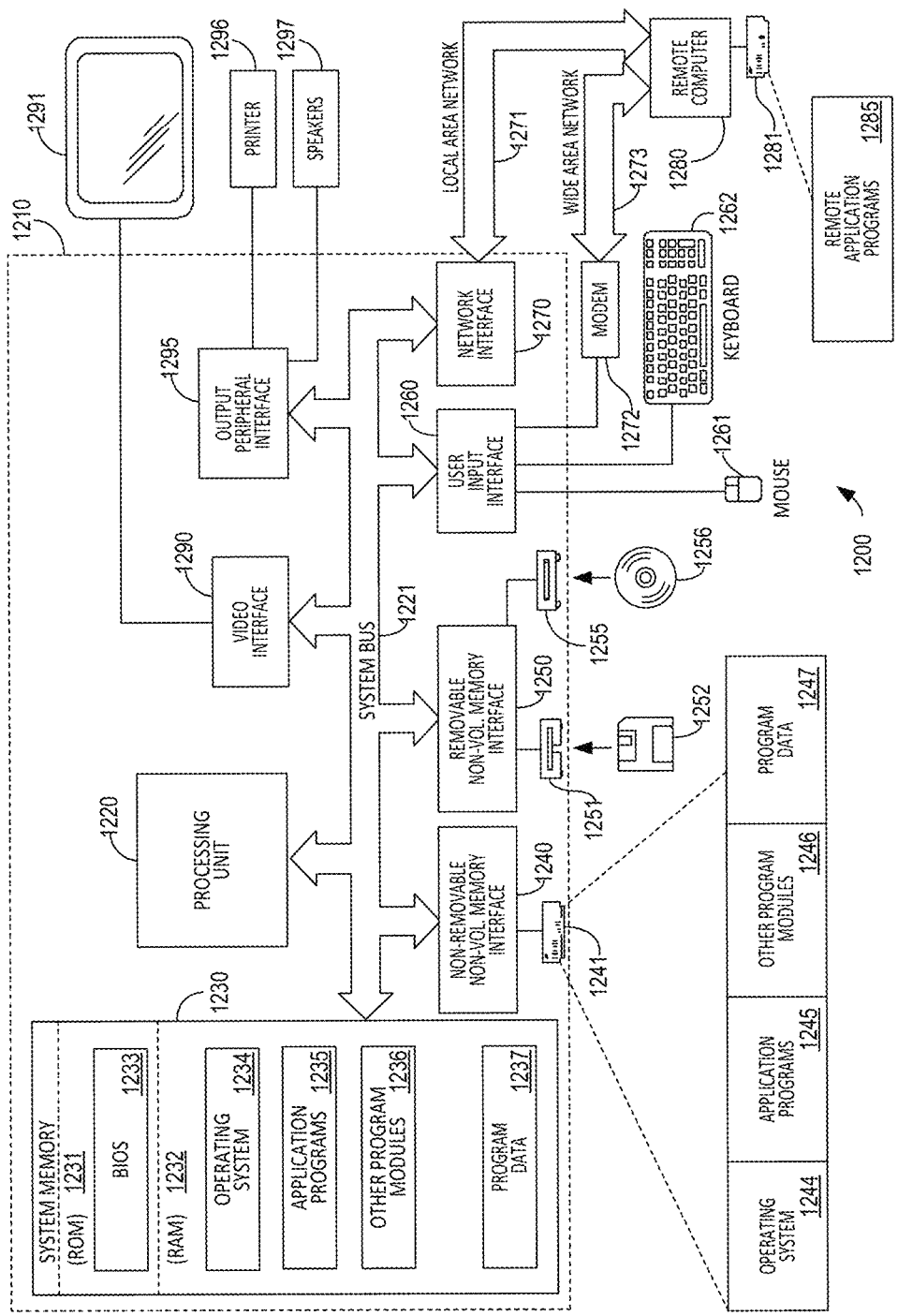
FIG. 12 is a schematic view of an illustrative computing system environment on which aspects of the invention may be implemented.

FIG. 12 depicts an example of a suitable computing system environment 1200 on which aspects of the invention may be implemented. For example, the computing system environment 1200 may be used to monitor and/or control one or more modules of a navigation system. Such a computing environment may represent a home computer, a tablet, a mobile device, a server and/or any another computing device.

The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the illustrative operating environment 1200.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 12, an illustrative system for implementing aspects of the invention includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are illustrative and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to determine a spatial position (e.g., based on image matching, odometry, etc.), to extract features from one or more images, to communicate with a data repository, to perform speech recognition, to perform speech synthesis, to compress and/or decompress image and/or video data, or combinations thereof. Example of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Having herein described several embodiments, several advantages of embodiments of the present application should be apparent. One advantage is that small scale (e.g., sub-meter) navigation of interior and exterior spaces may be provided to a visually impaired user.

Various inventive concepts may be embodied as one or more methods, of which examples have been provided. The acts performed as part of any method described herein may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A system for guiding a visually impaired user, the system comprising:
   an image acquisition device comprising multiple cameras mounted on a wearable head unit, the image acquisition device configured to capture image data;
   a plurality of path data stored in a database, the path data identifying traversable paths to and from selectable locations, wherein the path data is derived from previously captured images of the locations and the identified traversable paths include a map containing graph nodes representing defined locations, captured images, and annotations;
   an inertial odometry sensor for identifying motion based on inertial measurements and providing inertial data pertaining to a location and a trajectory of a user being tracked;
   a visual odometry processor for performing feature detection on the image data to obtain a plurality of features from the image data, wherein feature detection includes identifying curves, edges, and evaluating metadata of the image data;
   an analysis processor for comparing the plurality of features from the image data and the plurality of stored path data to determine a user's location;
   a map processor for automatically selecting the traversable path from the stored path data corresponding to the user's location and a user-selected destination location;
   a navigation processor for guiding the user along the traversable path to the user-selected destination;
   a haptic device configured to receive input from the navigation unit and render haptic gestures as non-audible guidance to the user on the traversable path to the destination; and
   an audio interface configured to receive spoken input from the user and produce audio feedback to the user.

2. The system of claim 1 wherein the image acquisition device captures image data of objects in multiple directions in synchronization with one another from the multiple cameras.

3. The system of claim 2 wherein the image analysis processor generates an N-best list of closest matches between previously acquired image data and newly acquired image data, along with the corresponding match scores, a closest matching image data used to estimate the location and/or orientation of the user.

4. The system of claim 2 wherein the visual odometry processor receives image data of the user's environment from the image data to determine incremental motion of the user.

5. The system of claim 2 wherein the inertial odometry sensor comprises any one or combination of accelerometers, magnetometers and/or gyroscopes that detect motion.

6. The system of claim 5 wherein the map comprises an undirected graph containing nodes that represent known locations, wherein each node includes any one or combination of location, references to neighboring or adjacent nodes, annotations, image data associated with the node, a timestamp indicating when the node was created, and/or a list of connecting links.

7. The system of claim 6 wherein the map further comprises edges indicating a walkable path between two nodes.

8. The system of claim 7 wherein the navigation processor publishes a sequence of commands indicating which direction the user needs to move to reach a next node in the walkable path from an origin node to a destination node, where the commands are dynamically updated based on the user's progress as the user follows the directions.

9. The system of claim 8 wherein the haptic device comprises multiple haptic feedback components.

10. A method comprising:
in a wearable navigation system comprising the system of claim 1;
determining a navigation instruction to be conveyed to a user, the navigation instruction comprising a direction to a target location identified by a vector in a direction of the target location from the user's current location and a difference in the direction between the vector and the user's current heading;
identifying a haptic gesture adapted to convey the navigation instruction; and
rendering the haptic gesture by activating one or more haptic feedback components of a haptic device according to the haptic gesture.

11. The method of claim 10 wherein the target location is one of a series of incremental target locations along a sequence of nodes forming a path to a destination.

12. The method of claim 10 wherein the target location is a destination location.

13. The method of claim 10 wherein the navigation system is a wearable device.

14. The method of claim 10 wherein the user's current location is determined by the navigation system.

15. The method of claim 14 wherein the navigation system receives image data from one or more image acquisition devices and matches features detected in the image data with features detected in previously acquired image data to facilitate tracking movements of the user in an environment.

* * * * *